(12) United States Patent
Jalali et al.

(10) Patent No.: US 8,376,218 B2
(45) Date of Patent: Feb. 19, 2013

(54) APPARATUS AND METHOD FOR DISPERSIVE FOURIER-TRANSFORM IMAGING

(75) Inventors: Bahram Jalali, Los Angeles, CA (US); Keisuke Goda, Los Angeles, CA (US); Kevin Kin-Man Tsia, Mah On Shan (HK)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 12/985,539

(22) Filed: Jan. 6, 2011

(65) Prior Publication Data

US 2011/0168776 A1 Jul. 14, 2011

Related U.S. Application Data

(63) Continuation of application No. PCT/US2009/051608, filed on Jul. 23, 2009.

(60) Provisional application No. 61/083,255, filed on Jul. 24, 2008.

(51) Int. Cl.
*G06F 17/00* (2006.01)
(52) U.S. Cl. .......... 235/375; 235/385; 235/462.13
(58) Field of Classification Search .......... 235/462, 235/472, 375, 385
See application file for complete search history.

(56) References Cited

U.S. PATENT DOCUMENTS 4,874,936 A * 10/1989 Chandler et al. .......... 235/494
6,705,526 B1 * 3/2004 Zhu et al. .......... 235/472.01

OTHER PUBLICATIONS

Weiner, A.M.—"Femtosecond pulse shaping using spatial light modulators"—Review of Scientific Instruments, vol. 71, No. 5, May 2000, pp. 1929-1960.
Xiao, S. et al.—"2-D wavelength demultiplexer with potentional for > 1000 channels in the C-band"—Optics Express, vol. 12, No. 13, Jun. 28, 2004, pp. 2895-2902.

(Continued)

*Primary Examiner* — Michael G Lee
*Assistant Examiner* — Tabitha Chedekel
(74) *Attorney, Agent, or Firm* — John P. O'Banion

(57) ABSTRACT

A barcode reading apparatus and method in which the spectrum of a probe light is first Fourier-transformed into space, directed upon a barcode, and then Fourier-transformed converting the spectrally encoded barcode pattern to a time domain waveform. In one implementation, the Fourier transformation from the spectrum domain into a spatial domain is performed by a dispersive element, while the Fourier transformation from the spectrally encoded barcode pattern to a time domain waveform is performed by group-velocity dispersion (GVD). The temporally encoded barcode pattern is detected by a photodetector, digitized by a digitizer, and analyzed by a digital signal processor. The invention is applicable to a number of fields which involve the reading of one- and two-dimensional barcodes, displacement sensing, surface measurements, measurement of width and gap, flow cytometry, reading of optical media, presence or absence detection, and other related fields.

65 Claims, 15 Drawing Sheets

OTHER PUBLICATIONS

Xie, T. et al.—"Fiber-optic-bundle-based optical coherence tomography"—Optics Letters, vol. 30, No. 14, Jul. 15, 2005, pp. 1803-1805.

Yaqoob, Z. et al.—"High-speed two-dimensional laser scanner based on Bragg gratings stored in photothermorefractive glass"—Applied Optics, vol. 42, No. 26, Sep. 10, 2003, pp. 5251-5262.

Yaqoob, Z. et al.—"Passive Optics No-Moving-Parts Barcode Scanners"—IEEE Photonics Tech. Lett., vol. 16, No. 3, Mar. 2004, pp. 954-956.

Yaqoob, Z. et al.—"Free-space wavelength-multiplexed optical scanner demonstration"—Applied Optics, vol. 41, No. 26, Sep. 10, 2002, pp. 5568-5573.

Yaqoob, Z. et al.—"Free-space wavelength-multiplexed optical scanner"—Applied Optics, vol. 40, No. 35, Dec. 10, 2001, pp. 6425-6438.

Yelin, D. et al.—"Three-dimensional imaging using spectral encoding heterodyne interferometry"—Optics Letters, vol. 30, No. 14, Jul. 15, 2005, pp. 1794-1796.

Yelin, D. et al.—"Three-dimensional miniature endoscopy"—Nature Brief Commun., vol. 443, Oct. 19, 2006, pp. 765.

Yelin, D. et al.—"Spectral-domain spectrally-encoded endoscopy"—Optics Express, vol. 15, No. 5, Mar. 5, 2007, pp. 2432-2444.

Yelin, D. et al.—"Large area confocal microscopy"—Optics Letters, vol. 32, No. 9, May 1, 2007, pp. 1102-1104.

WIPO, international search report and written opinion issued on Feb. 22, 2010, with claims, counterpart PCT International Application No. PCT/US2009/051608, pp. 1-12.

Chinese Intellectual Property Office, PRC Application No. 200980131718.1, Office Action issued Sep. 26, 2012, English-language summary (pp. 1-2), claims examined (pp. 3-8), Chinese-language office action (pp. 9-18), pp. 1-18.

\* cited by examiner

APPARATUS AND METHOD FOR DISPERSIVE FOURIER-TRANSFORM IMAGING

CROSS-REFERENCE TO RELATED APPLICATIONS

This application a 35 U.S.C. §111(a) continuation of, and claims priority to, PCT international application number PCT/US2009/051608 filed on Jul. 23, 2009, incorporated herein by reference in its entirety, which claims priority to U.S. provisional application Ser. No. 61/083,255 filed on Jul. 24, 2008, which is incorporated herein by reference in its entirety.

The above-referenced PCT international application was published on Jan. 28, 2010 as PCT International Publication No. WO 2010/011875, and is incorporated herein by reference in its entirety.

STATEMENT REGARDING FEDERALLY SPONSORED RESEARCH OR DEVELOPMENT

This invention was made with Government support of Grant No. N66001-07-1-2007, awarded by the Department of Defense. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to optical imaging, and more particularly to high-speed optical imaging using dispersive Fourier-transform imaging.

2. Description of Related Art

A barcode is a machine-readable binary representation of information which normally appears as a series of low reflectance bars (e.g., dark or black bars) on a high reflectance background (e.g., light or white background). A measurable difference in optical properties of the bars (e.g., reflectance of dark bars in contrast to light bars) is converted to a binary representation. For example, with the dark bars corresponding to 0's with the white spaces therebetween corresponding to 1's, or vice-versa, depending on the decoding software. Barcodes can be read by optical scanners called barcode readers which measure optical reflections from the black bars or white spaces when a probe beam is incident on them.

Since their introduction, barcodes have become indispensable in labeling and inventory management. Some modern applications of barcodes, include: (a) product labeling and automated detection; (b) ticketing and permits; (c) movement and flow, such as mail, packages, airplane luggage, rental cars, and nuclear waste; (d) document management, including imaging, filing and indexing; (e) blood bank information systems; (f) tracking in bee research; (g) collecting parcel data from multiple networked sources and tracking thereto. One of ordinary skill in the art will appreciate that barcode applications have become ubiquitous in our modern society.

A barcode reader is an essential part of barcode technology. A conventional reader consists of a scanner, a decoder (either built-in or external), and a cable used to connect the reader with a processing device (e.g., computer) for processing the digital signals. A barcode reader is an optoelectronic device that measures optical reflections from barcodes, such as consisting of non-reflective black bars and reflective white spaces. There are different types of barcode readers available in the marketplace, which use slightly different methods for reading and decoding barcodes. Barcodes can be of a one-dimensional variety as described with bars and lines, or may be two-dimensional with dots or other small spatially constrained symbols contained on a two-dimensional field.

One form of barcode reader is a pen-type reader, in which a continuous-wave optical source and a photodiode receptor are proximal one another, such as in the tip of a pen or wand. To read a barcode, the tip of the pen is moved across the bars in a steady motion. A voltage waveform that represents the bar and space pattern in the barcode is generated in response to photodiode detection of changing light power reflected back from the bars as they are exposed to the moving incident light. The waveform detected by the photodiode is decoded by the scanner in a manner similar to the way Morse code dots and dashes are decoded.

Another form of barcode reader is a laser scanner, which works much as a pen type reader, except that it employs either a reciprocating mirror or a rotating prism to scan the laser beam back and forth across the barcode. Just like the pen type reader, a photodiode is used to measure the power of the light reflected back from the barcode. In both pen type readers and laser scanners, the light emitted by the reader is tuned to a specific wavelength and the photodiode is designed to detect only this wavelength.

Another form of reader is a CCD reader, in which a charge-coupled device (CCD) reader, or alternatively a CMOS active pixel reader, utilizes an array of optical sensors lined up in a row in the head of the reader. The CCD reader measures the light reflected from a barcode, generating a voltage pattern identical to the pattern in the barcode by measuring the voltages across each sensor in the row. One important difference between a CCD reader and a pen type or laser scanner is that the CCD reader measures the reflection of ambient light from the barcode while pen or laser scanners measure reflected light at the specific wavelength which originated from the scanner itself.

Another form of reader is a camera based reader, in which a camera captures a two-dimensional image of the barcode. These are particularly well-suited for use with reading two-dimensional barcodes, although they can technically read either type of bar code. It will be appreciated that for a given geometric resolution (e.g., based on minimum line or pixel spacing) the information density of a two-dimension barcode can far exceed that of a one-dimensional bar-code which is only scanned across a single direction. By way of example, an image of the barcode is captured by a small CCD or CMOS camera imager and decoded using digital image processing techniques.

Although barcode readers are useful for keeping track of a large number of items, the conventional barcode technology has its limitation in speed when it requires tracking of a considerably large number of items (e.g., on the order of millions) due to their slow reading and decoding process. Conventional barcode readers have a scan rate on the order of several hundred scans per second. Even the fastest barcode reader is limited to a rate of about one thousand scans per second. The speed limitation in scanners is largely in response to the need of scanning the source light across the barcode, while in imaging readers the image frame rate limits the number of scans per second.

The speed limit of conventional barcode readers combined with the conventional digital signal processing prohibits one from tracking a considerably larger number of items, especially in applications including the fields of bioinformatics where inherently a large number of items need to be managed, such as blood banks, stem cell banks, sperm banks, and DNA sequence banks.

For example, barcode technology is currently used for blood bank information systems, allowing safe blood donation and transfusion service that involve collecting, processing, storing, and providing human blood intended for transfusion. Incorrect blood component transfusion is the most frequent serious incident associated with transfusion. Errors which underlie these incidents frequently are attributed to sample misidentification. In face of the accelerating globalization, it is critical to track and manage an extremely large number of blood samples. However, for proper identification, barcode technology requires a significant amount of information to be encoded, such as including the patient's hospital number, last name, first name, date of birth, gender, blood type, and so forth. The need for this much information challenges the speed of present day scanners, especially when a probed barcode must be compared with a large database. This translates into a trade-off between scan speed and accuracy.

Accordingly, a need exists for a system and method of reading barcodes and performing displacement sensing in less time without the need of traversing the light over the item to be scanned. These needs and others are met within the present invention, which overcomes the deficiencies of previously developed scanning systems and methods.

BRIEF SUMMARY OF THE INVENTION

The present invention is an apparatus and method for reading targets in response to performing dispersive Fourier-transforms on the beam directed to the target or from the target. The target may comprise any form of encoded or unencoded target, including various forms of barcodes, as well as unencoded samples of solids, liquids and/or gases. For the sake of simplicity the term "target" is used herein to refer to any target or sample about which information can be collected in response to its reflectance or transmission of an optical beam directed at the target.

The invention is particularly well-suited for applications relating to barcode reading and correlation matched barcode reading, although it is well suited for a wide range of detection, measurement and reading applications. Operation of the invention is generally based on detection which utilizes spectral encoding and decoding of barcodes in space and time domains respectively, allowing reading and database correlation matched detection of tens of millions of samples (e.g., barcodes) within a second. This is up to four orders of magnitude faster than conventional barcode readers. The present invention also provides for high-speed displacement sensing, with the detection and/or measurement of optical response across one or more dimensions of space.

For the sake of simplicity, the invention largely discusses reading of barcode samples, in which the sizing of adjacent bars are determined and thus their coding can be decoded, to generate alphanumeric information. These barcodes may comprise any barcode structures which are optically responsive to the optical beam probe described herein. For example, the bars may comprise material of different color, reflectivity, or otherwise have a reflection which is optically responsive to the probe beam. Alternatively, or additionally, the bars may comprise displacements, such as in response to etched, or raised, structures.

To simplify discussion, the present invention discusses "reading" of the sample regardless of what is being decoded, detected and/or measured, and is not limited to samples which contain encoded information, such as the case of a barcode. The "reading" of non-encoded samples is considered to mean determining properties of the sample, including: presence or absence of constituents, size, shape, roughness, orientation, flow, and any properties of interest within the sample which can be determined from the probe beam reflecting from said sample. Alternatively, the present invention can be configured for reading samples in response to the level of optical transmission through the sample, wherein different characteristics of the sample can be discerned by the transmissive light, instead of the reflected light. In addition, the invention can be implemented to provide separate detection of both reflection and transmission of a sample if additional information is desired. The techniques taught for the present invention can also be used for analyzing the phase of transparent objects by detecting the transmitted light interferometrically.

This invention pertains generally to optical imaging, especially for high-speed displacement sensing and reading of barcodes, performing correlation matched detection against reference databases, and more particularly to an apparatus and method for dispersive Fourier-transform imaging and optical database correlation based on spectral encoding and decoding of one- or two-dimensional barcodes in spatial and temporal domains respectively, including sample exposure to a broadband pulsed beam and optical reflection detection of a time-domain waveform preferably converted to digital signals.

The method exposes a barcode to a broadband pulsed optical probe beam which is spatially dispersed by a diffraction grating so that each separated wavelength of the light is incident on a different part of the barcode along a transverse line on the barcode. The barcode information is encoded into the spectrum of the reflected light. The reflected light from the barcode returns to the diffraction grating which re-combines the spectral dispersed components. The reflected beam is then subjected to Fourier transformation performed using group-velocity dispersion (GVD) and detected by a single-pixel photodetector. During the Fourier transformation, an optional internal amplification can also be implemented to increase the signal-to-noise ratio and hence the detection sensitivity. Homodyne detection and/or balanced detection can also be performed to improve the signal-to-noise ratio.

In a preferred embodiment, the photodetector converts the optical signal into an electronic signal that can be amplified and digitized. The dispersive Fourier transformation in combination with the photodetector maps the optical spectrum, which is the spectrally encoded barcode information, into an electronic time-domain waveform and represents an all-electronic spectrum analyzer. The embodiment of the invention thus eliminates the need for a traditional optical spectrometer (e.g., a diffraction grating and an array detector), and offers high detection sensitivity, especially in view of the incorporation of internal amplification.

It should be appreciated that another dispersive element may be used according to the present invention to further disperse the probe beam in the perpendicular direction, whereby the beam spectrum spans two dimensions in such a manner that the frequency of the beam makes a raster scan. Another method is that when the probe beam is scanned in the direction perpendicular to the transverse line that the probe beam via the diffraction grating is incident upon, then two-dimensional images of the barcode can be obtained, such as for use in reading two-dimensional barcodes. It should also be appreciated that the techniques herein can be extended into three dimensions. In one embodiment, a second two dimensional probe beam may be directed at the sample from an orthogonal direction, and the optical reflection and/or transmission captured and processed according to the invention, to provide reading and analysis of a sample in three dimensions.

The present invention also allows for optional ultrafast correlation matched detection of measured barcodes with a large database that consists of millions of barcodes. If an electro-optic modulator is placed before the photodetector, correlation matched detection is realized. The amplitude of the probed barcode signal is modulated by the conjugate of the known barcode pattern from the database. If the measured barcode matches the one from the database, the detected signal shows a correlation peak. The measured signal arriving from the subsequent laser pulses is compared with other patterns in the database until the correct pattern is identified. Before modulation onto the optical beam, the database pattern is converted to the conjugate time series using a pattern generator, or a digital to analog converter. Naturally, the modulating database pattern must be synchronized with the incoming measured pattern. Henceforth, scanning correlation matched detection is performed at the pulse repetition rate of the laser. It should be evident that the use of correlation matched detection is optional, as the dispersive Fourier transform scanner can be used without it.

The use of a diffraction grating to map an optical spectrum into space is well known. When the spatially diffracted light is reflected from an object, the reflectivity pattern of the object is encoded onto the optical spectrum. The mapping of optical spectrum has been used for medical imaging in which charge-coupled devices (CCDs) are used to decode the spectrally encoded spatial information.

One important aspect of the present invention is the utilization of a dispersive Fourier transformation to map the spatial information (encoded onto the optical spectrum) into a time-domain signal, and the utilization of this technique for reading of barcodes. Dispersive Fourier transformation has been applied to measurement of the spectrum of optical pulses for absorption spectroscopy and Raman spectroscopy, optical reflectometry, and optical coherence tomography. Measuring the optical spectrum using dispersive Fourier transformation eliminates the need for a diffraction grating and a detector array. These elements are replaced by a dispersive fiber, a single photodetector, and a digitizer. This simplifies the system, and more importantly, enables fast real-time barcode acquisition.

A major limitation of dispersive Fourier transform, and one that the present invention overcomes, is loss in the dispersive medium. The loss can be due to unwanted absorption or scattering that occurs as the light passes through the dispersive device. It also has a more fundamental source described by the intimate connection between dispersion and loss imposed by the Kramers-Kronig relations. Independent of its source, the loss limits the detection sensitivity of the system. This can be understood by recognizing that, by virtue of spectrum-to-time conversion, the spectral resolution (and hence the number of image pixels of the barcode scanner) is fixed by the temporal resolution of the electrical detection system. Stated differently, the electrical bandwidth of the digitizer limits the spectral resolution, a relation given by $\Delta\lambda=0.35/(D \cdot f_{dig})$, where $\Delta\lambda$ is the optical spectral resolution, D is the total group-velocity dispersion, and $f_{dig}$ is the input bandwidth of the real-time electronic digitizer. The product of $\Delta\lambda \cdot D$ is determined by the bandwidth of the digitizer, such that to increase the spectral resolution (i.e., to increase the number of image pixels) one is forced to increase total group-velocity dispersion D.

However, this increase of spectral resolution is achieved at the expense of increasing optical loss and reducing detection sensitivity. Losses in the dispersive element are thus a central problem when high detection sensitivity and high spectral resolution are desired. Since the barcode spatial information is encoded onto the optical spectrum, the loss of the dispersive element imposes a limit on the number of image pixels and detection sensitivity. The sensitivity can be improved by using a long signal integration time, but this limits the speed of barcode reading. Therefore, the loss in the dispersive element creates a trade-off between the detection sensitivity, the number of image pixels, and scanning speed. Increasing laser power is not an attractive solution because it can lead to unwanted nonlinear signal distortion.

The present invention relies on the use of internal amplification within the dispersive element for overcoming the tradeoffs on sensitivity, the number of image pixels, and scanning speed. The above trade-off is overcome by compensating for losses in the dispersive element. Toward optimizing performance, the amplification is performed in the dispersive fiber to increase the strength of the signal reflected back from the barcode. Internal amplification in a dispersive element has previously been demonstrated in our laboratory in relation to real-time Raman and absorption spectroscopy, as well as a femtosecond digitizing. This amplification is applied in the present invention toward optimizing one or more barcode scanner embodiments.

The desirable features for a dispersive element are high total dispersion, low loss, large optical bandwidth, smooth dispersion over the bandwidth, and commercial availability. Dispersive fibers such as dispersion compensation fiber (DCF) offer an optimum combination of these parameters, although there are other options such as chirped fiber Bragg gratings (CFBG). While CFBG are more compact than DCF, the latter can also function as a Raman amplifier to compensate for the losses. The loss can also be compensated by discrete optical amplifiers, such as erbium-doped fiber amplifiers or even semiconductor optical amplifiers. Distributed Raman amplification within the dispersive fiber is generally preferred in that it maintains a relatively constant signal level throughout the Fourier transformation process. This relatively constant signal level is important in that it maximizes the signal-to-noise-and-distortion ratio by keeping the signal power away from low power (noisy) and high power (nonlinear) regimes.

One of the advantages of Raman amplification over semiconductor optical amplifiers is that Raman amplification is naturally broadband when used in an amorphous medium, such as glass. The gain spectrum can be further tailored by using multi-wavelength pump lasers, and, surprisingly but fortuitously, extremely broadband gain spectra can be realized using incoherent pump sources. This is highly desirable because a large optical bandwidth results in a large transverse barcode detection range. Raman-amplified dispersive elements also eliminate the need for a high power source, which can potentially lead to unwanted nonlinear signal distortion.

The invention is amenable to being embodied in a number of ways, including but not limited to the following descriptions.

One embodiment of the invention is an apparatus for reading barcodes and sensing displacements, comprising: (a) means for generating a broadband pulsed probe beam; (b) means for mapping the spectrum of the pulsed probe beam into a spatial domain directed at a target to be read based on its responsive optical signal; (c) means for dispersive Fourier-transformation of the responsive optical signal to convert the responsive optical signal into a time-domain waveform; and (d) means for detecting and analyzing the time-domain waveform to determine barcode patterns and/or displacements within the target being read.

In the embodiments of the invention, the responsive optical signal can be generated in response to optical energy which is reflected from the target to the means for dispersive Fourier-transformation, or optical energy that is transmitted through the target to the means for dispersive Fourier-transformation. In addition, combination embodiments can be implemented which read information about the sample based both on the reflected and transmitted light.

The apparatus can be implemented so that the optical beams, including probe beam and responsive optical signal, are carried through free-air, optical fiber (or other optically transmissive structure), or through a combination of free-air and optical fiber.

Alternatively, the apparatus can be implemented by changing the order of mapping the spectrum into space (spatial dispersion) and dispersive Fourier transformation (temporal dispersion).

In at least one implementation the means for generating the broadband pulsed probe beam comprises a laser configured to generate pulses. In one mode of the invention, a pulse picking element is optionally included to provide a means for picking selected pulses from a train of pulses generated by the pulsed laser, or similar source. The pulsed beam probe can include or be modified in response to an optional means for amplification and/or filtering, thereby increasing the signal-to-noise ratio and detection sensitivity of the apparatus. Similarly, amplification and/or filtering can be optionally applied to the responsive optical signal received from the sample (e.g., from the reflected and/or transmitted light). By way of example and not limitation, optical amplification may be performed using stimulated Raman scattering, a semiconductor amplifier, or a fiber amplifier. Still further, a fiber amplifier may be disposed before, within, or after the means for dispersive Fourier-transformation, while a continuous-wave light or pulsed light can pump the fiber amplifier. Another optional element is a means for supercontinuum generation for broadening the spectral bandwidth of light emanating from an optical source, and may be incorporated within the source or implemented as a separate optional element.

In at least one implementation, the means for mapping the spectrum into the spatial domain comprises a dispersive element, such as a diffraction grating, prism, virtually imaged phased array disperser, or similar which is capable of separating the wavelengths of the incoming broadband pulsed probe beam.

In at least one implementation, such as when detecting reflected optical energy over a portion of the same path as the incident probe light, an optional means for separating beams is incorporated.

In at least one implementation, the means for dispersive Fourier-transformation converts the responsive optical signal into a time-domain waveform using an element for inducing group-velocity dispersion (GVD), such as a dispersive element, and/or a chirped optical element which is configured for inducing group-velocity dispersion (GVD) in converting the responsive optical signal into a time-domain waveform.

In at least one implementation, the means for detecting and analyzing the time-domain waveform utilizes at least one photo responsive element, such as light responsive semiconductor devices, (e.g., photodiodes, phototransistors, and so forth), or any other devices whose electrical characteristics change in response to changes in the character of the light received, to detect the incoming light. The incoming light is converted by the detector and preferably converted in a digitizer, which changes the analog signal into a digital signal so as to simplify processing. It should be appreciated, however, that at least limited information could be read from a sample in response to directly processing these analog signals, without first converting them into digital signals. A signal processor analyzes the electrical signals from the detector to thus read the sample and provide information about coding, spatial displacement and other readable aspects of the sample. Preferably, the signal processor comprises one or more processors configured with software for performing digital signal processing.

In at least one implementation, the apparatus is configured for reading the target as a one- or two-dimensional barcode, for example as used in tracking of commercial items, serial control of printed-circuit boards, traceability control of hard drive (HDD) parts, automatic sorting in conveyor lines, tracking of PC media drives, wafer production, or any an instance in which barcode are being read.

In at least one embodiment of the invention, reading from a sample can be in the form of a correlation, wherein the actual characteristics of the sample are optically compared to the expected characteristics of that sample, such as read from a database. As this aspect of the invention is easiest to understand with respect to a coded sample, a barcode will be considered by way of example and not limitation. In one mode of correlation the expected barcode for the sample (e.g., within successive barcodes) is used to modulate the responsive optical signal from the sample, wherein correlation can be readily ascertained from the received signal, such as in response to thresholding, without the need of further analysis. In at least one implementation correlation can be provided by incorporating an electro-optic modulator disposed prior to conversion of the responsive optical signal to an electrical signal, with an expected barcode pattern received from the database and its conjugate applied to the electro-optic modulator. The correlation matched detection of the target to the database is realized in response to whether or not the responsive optical signal being detected has a correlation peak. In at least one mode of this correlation, a pattern generator is used for generating correlation patterns based on information from a database containing information about a set of targets within which should be found the current target. An amplitude modulator is configured for modulating the responsive optical signal, and a means for threshold sensing of the amplitude modulated responsive optical signal indicates positive or negative correlation between the target and correlation patterns received from the database used for modulating the amplitude of the responsive optical signal.

Embodiments of the invention can be utilized for reading a target in either one dimension or two dimensions in response to light reflected from and/or transmitted through the target (sample). The invention can be implemented for reading coded targets (e.g., forms of optically ready barcodes), as well as performing high-speed displacement sensing on targets. It should be appreciated that the displacement sensing can register the shape and configuration of targets, measurement of rough surfaces, measurement of width and gaps, as well as the presence of absence of material and/or physical objects or elements. Displacement sensing can also be utilized with the present invention for performing flow cytometry by detecting and/or measuring the motion and morphological features (e.g., size, shape, etc.) of any form of particles within a fluid. In other implementations of the present invention, the apparatus can be configured for reading a target which is optically encoded with data, such as within an optical storage media, including media formatted according to protocols including those used with CD, DVD, and Blu-Ray discs.

In at least one implementation, the apparatus is configured for reading the target in an application selected from the group of application fields consisting of bioinformatics, tracking of medical specimens, tracking stem cell banks, sperm banks, use in DNA sequence banks, or any instance in which biological information is read from the sample being tested within the apparatus.

One embodiment of the invention is an apparatus, comprising: (a) a broadband optical source configured for generating a pulsed probe beam; (b) a spectral encoder configured for converting the pulsed probe beam into a spatial domain and directing it at a target to be read; (c) a spatial decoder configured for converting the spatial domain, of light reflected from, or transmitted through, the target and into a time-domain; and (d) a signal processor configured for detecting and analyzing the time-domain waveform to read patterns and/or determine displacements within the target.

One embodiment of the invention is a method of reading patterns and determining displacements of a target, comprising: (a) generating a pulsed probe beam from a broadband optical source; (b) converting the pulsed probe beam into a spatial domain; (c) directing the spatial domain pulsed probe beam at a target to be read; (d) converting the spatial domain of light from the target being read into a time-domain waveform; and (e) detecting and analyzing the time-domain waveform, within a processor configured for executing program instructions from memory, to read patterns and/or determine displacements within the target.

The present invention provides a number of beneficial aspects which can be implemented either separately or in any desired combination without departing from the present teachings.

An aspect of the invention is an apparatus and method for reading information from optical targets.

Another aspect of the invention provides for the ability to read target information in response to directing a first optical signal of a spatial domain at the target, converting the light received from the target into a time domain, and then analyzing the time domain waveform.

Another aspect of the invention provides for the reading of information in one, two and three dimensions.

Another aspect of the invention provides for the reading of information in response to probe light which is reflected from or transmitted through the target, or a combination thereof.

Another aspect of the invention provides for the reading of coded targets, such as the reading of barcode information from targets.

Another aspect of the invention provides for correlation of target information against database information.

Another aspect of the invention provides for target correlation in response to modulating the optical signal and checking for correlation peaks in the responsive time domain waveform.

Another aspect of the invention provides for the reading of various encoded and unencoded forms of information from a target (sample).

A still further aspect of the invention is that the apparatus and method can be applied to a wide range of coded targets, such as one- and two-dimensional barcodes, as well as to gathering information about samples, including information based on presence, displacement, configuration, motion and so forth of constituents of the sample.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 15. It will be appreciated that the apparatus may vary as to configuration and as to details of the parts, and that the method may vary as to the specific steps and sequence, without departing from the basic concepts as disclosed herein.

Figure 1:
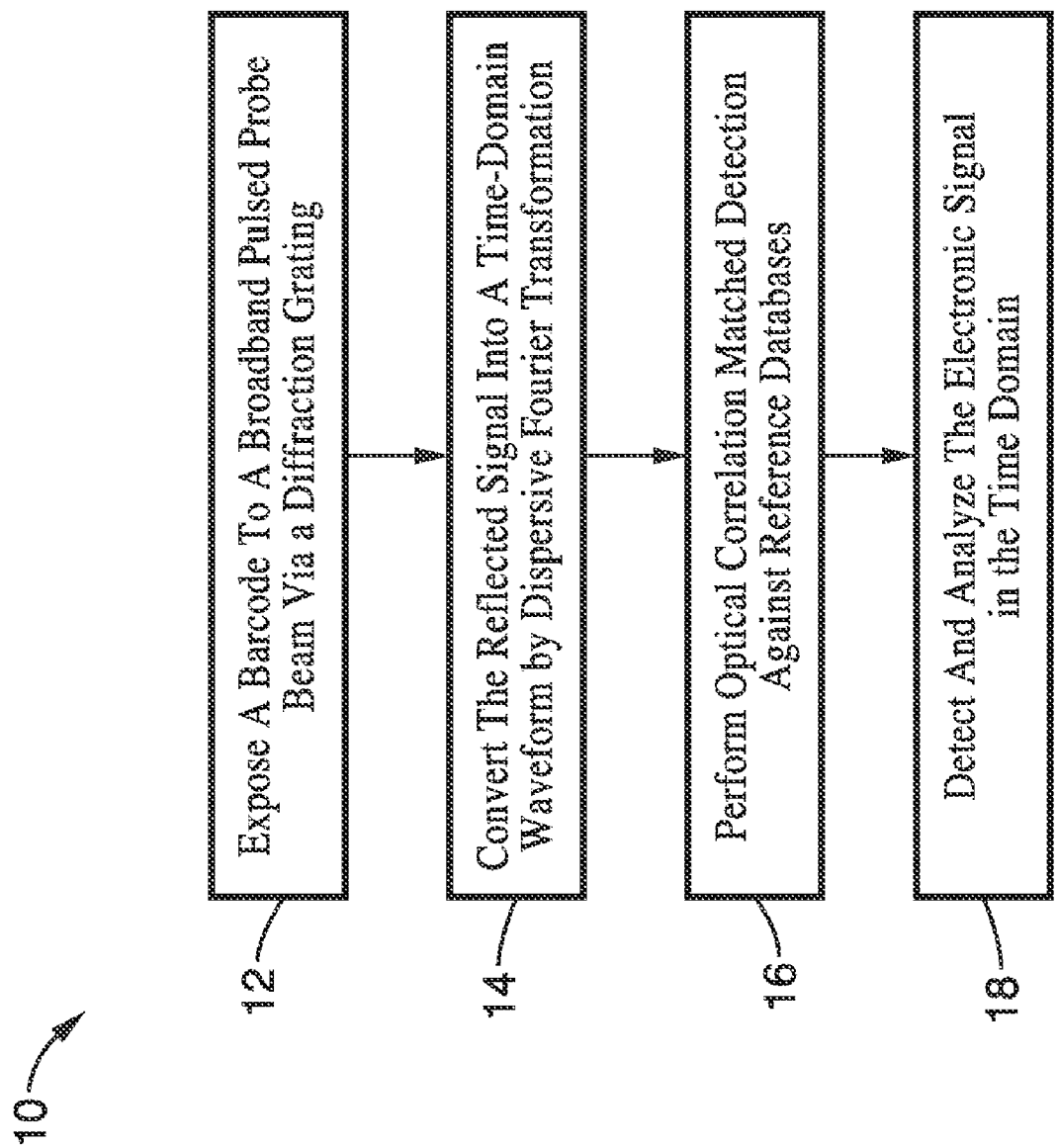
FIG. 1 is a flow chart of one embodiment of a method for performing dispersive Fourier-transform reflectivity measurements according to an aspect of the present invention.

FIG. 1 is an embodiment 10 of a method for dispersive Fourier-transform reflectivity measurement, summarizing the steps necessary for performing one- or two-dimensional barcode reading and optional correlation matched detection against known databases. According to this embodiment, a barcode is exposed to a broadband pulse through a diffraction grating at block 12, with the spatially dispersed spectrum being incident on the barcode. In block 14, the resulting reflected light from the barcode returns to the diffraction grating which reforms a pulse and is converted into a time-domain waveform by dispersive Fourier transformation. Then optional correlation matched detection against a reference database can be optically performed in block 16 upon the spectrally encoded barcode information by modulating it with an optical modulator fed by a pattern generator. The optical signal is detected by a photodetector in block 18 and its electronic signal is analyzed, such as by a digital signal processor, in the time domain.

Referring to block 12, the optical source is preferably a supercontinuum that is directed toward the barcode. It will be appreciated that supercontinuum generation can be generally described as a process in which laser light is converted to light having a very broad spectral bandwidth (e.g., having low temporal coherence). The spectral broadening is usually accomplished by propagating optical pulses through a strongly nonlinear device, such as an optical fiber. The supercontinuum may be created by passing a pulsed laser with a high peak power through a high nonlinearity fiber. Alternatively, the optical source may be generated by an ultra-short pulse laser having a large bandwidth, for example arising from a Titanium:Sapphire laser. The probe beam may be optically amplified and filtered prior to reaching the diffraction grating.

The bandwidth of the probe beam should be large, in some cases preferably as large as possible, because the diffraction angle range of the diffraction grating and the number of resolvable points on the barcode increase with the bandwidth. Spectral bandwidth can be as large as the target as well as the apparatus will allow. The bandwidth can be increased as long as temporally dispersed consecutive pulses are not overlapped in time. Also, it will be appreciated that there are limits for each of the components of the apparatus, for example the photodiode, as well as the optical elements. In addition, the target itself is best resolved within a specific spectral range, for example that which is clearly detected from a barcode in the visible spectrum may not show up when moving to the infrared portion of the spectra. Typically, the bandwidth would be in a range, such as 650 nm to 1100 nm in the visible to near-IR range, or some similar range within the visible, visible to UV, visible to IR, near IR, near UV and so forth.

The probe beam incident on the diffraction grating is spatially dispersed, separating the wavelengths of the probe beam. The dispersed light is then collimated by a cylindrical lens or another diffraction grating and incident on the barcode. The reflection from the barcode returns to the diffraction grating, reforming a pulse.

Considering block 14, group velocity dispersion is induced (chirped) by any desired optical element or combination thereof, such as a dispersive element, chirped optical element, or similar, to perform Fourier transformation and thus provide a means for dispersive Fourier-transformation of the reflected optical signal. This dispersive element comprises an optical element which induces group-velocity dispersion of the reflected optical signal. It should be appreciated that a chirped reflection response is one in which the Bragg wavelength is not constant but varies within the structure, for example in a chirped optical element, such as chirped mirror, the light at different wavelengths penetrates to a different extent into the mirror structure and thus experiences a different group delay. The dispersive element may be an optical fiber, a bulk crystal, a chirped mirror, or a chirped fiber Bragg grating. The dispersion in the dispersive element transforms the frequency-domain signal into a time-domain waveform. The constituent frequencies of the reflected light from the barcode that correspond to different points of the barcode along a transverse line are temporally distributed in a way that allows the reflected light from the different points of the barcode to be mapped into a time-domain waveform. During the Fourier transformation, the signal light may be optically amplified by stimulated Raman scattering when the dispersive element is optically pumped by broadband light. Alternatively, the reflected light may be optically amplified by a Raman amplifier or an erbium-doped fiber amplifier prior to the dispersive element which may or may not be optically amplified.

In block 16 optical correlation is shown being used for matching the detection against a data. It should be appreciated that a variant of this allows a series of correlation detection operations to be performed with a large database. The time-series barcode signal which has been Fourier-transformed as per block 14 is modulated by an amplitude modulator. For example, the modulation signal is supplied by a pattern generator which generates a series of 0's and 1's that correspond to white spaces and dark bars (opposite to the coding of barcodes) in the conjugate time series, so that the transmission of the amplitude modulator is zero only when the modulator cancels out the amplitude of the input barcode signal, whereby a positive correlation is detected.

Referring to block 18, if correlation matched detection with a reference database is not necessary, the reflection signal at block 14 can be directly detected by the photodetector. If it is needed, the photodetector detects the transmission of the amplitude modulator at block 16. The photodetector output signal is digitized by the digitizer which is properly triggered by the pulse train of the probe beam at a repetition rate. Only when the signal on the digitizer is zero, the measured barcode matches the barcode in the database whose signal is fed to the amplitude modulator. A correlation detection of a barcode in the database with the measured barcode is performed every pulse. In other words, a correlation detection of the measured barcode with many barcodes is done at the repetition rate of the laser pulse train.

Figure 2:
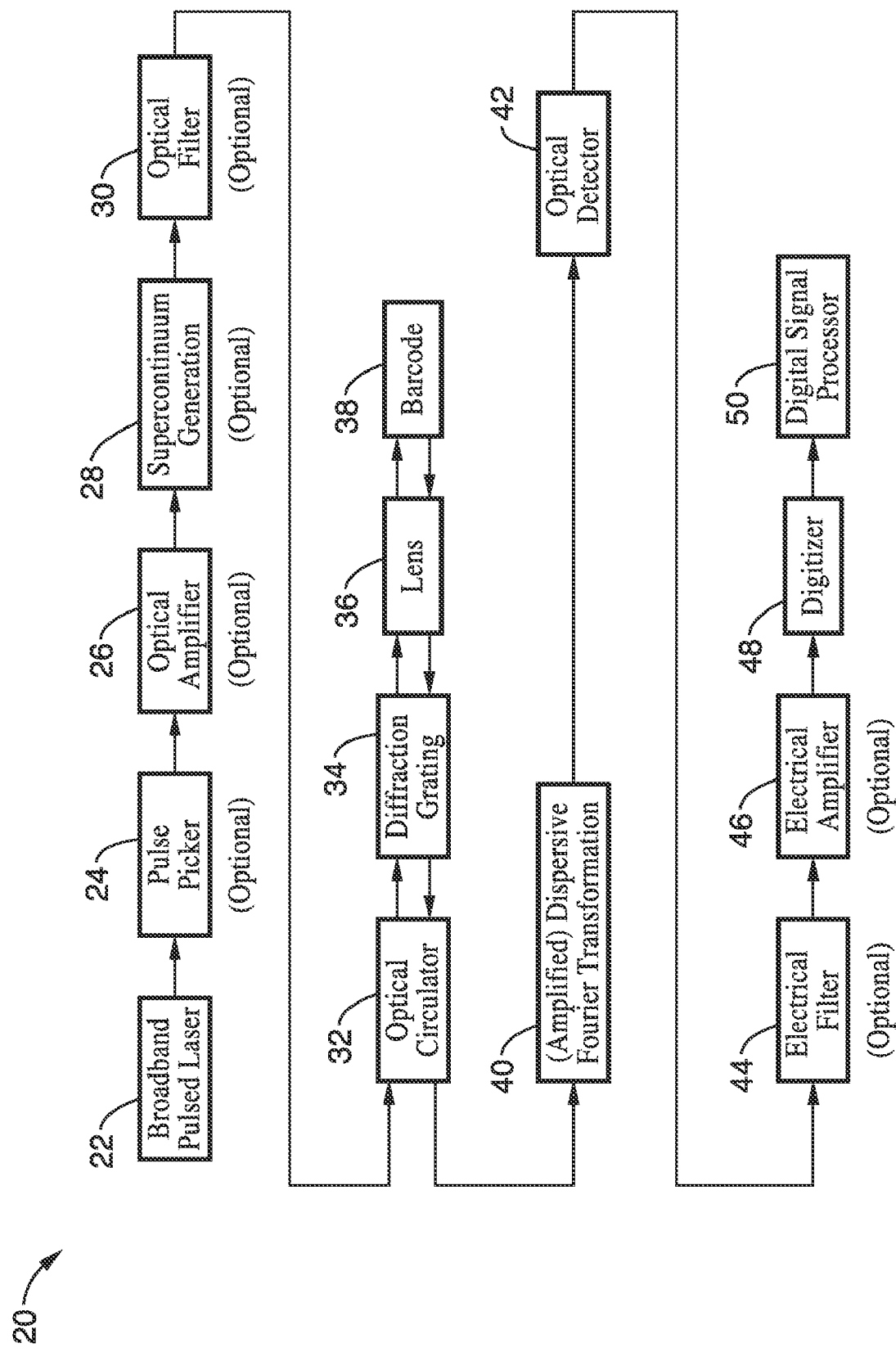
FIG. 2 is a schematic block diagram of an apparatus for performing one-dimensional dispersive Fourier-transform reflectivity measurements according to an embodiment of the present invention.

FIG. 2 illustrates an example embodiment 20 of a one-dimensional dispersive Fourier-transform reflectivity measurement according to the present invention. It should be appreciated that the apparatus may be utilized for barcode sensing as well as a wide range of high-speed forms of displacement sensing, and similar applications. In addition, the beam (pulsed probe beam) directed at the target to be read, detected and/or measured and the reflected optical signal thereof are carried through free-air, optically transmissive media or devices, such optical fiber, or through a combination thereof.

Generally, a means for generating a broadband pulsed probe beam, such as broadband pulsed probe laser 22, is directed to a means for separating 32 an optical signal directed toward the target, from an optical signal which is reflected from the target, such as comprising an optical circulator that isolates the light reflected from the target being read. Optional elements 24, 26 and 28 are discussed below.

The pulse stream is converted by a means for Fourier-transformation mapping 34 of the spectrum of the pulsed probe beam into a spatial domain, such as in response to using a diffraction grating, or similar optical element(s) (e.g., prism, virtually imaged phased array disperser, and/or similar) which spatially disperses the probe beam, separating its wavelengths onto a one-dimensional transverse line or elongate pattern across a target, such as barcode 38, which is being read. Alternatively, the system can be configured to read, detect, and/or measure one- or two-dimensional aspects of other targets which provide reflectivity differences in response to material properties and/or displacement.

A means for collimating 36 the pulsed probe beam, such as a lens, collimates or focuses the probe beam onto the barcode target 38. The barcode information is spectrally encoded into the spectrum of the reflected light from barcode 38. The reflection from barcode 38 returns to diffraction grating 34, reforming a pulse. The optical circulator 32 directs the reflection toward the (amplified) dispersive Fourier transformer 40 and isolates it from going back to the laser source 22. The reflection is then Fourier-transformed into a time-domain waveform 40 by a means for dispersive Fourier-transformation of the reflected optical signal to convert the reflected optical signal into a time-domain waveform. Optionally, optical amplification may be implemented in the dispersive Fourier-transformation process so that it compensates for the inevitable optical loss due to the dispersive process. Output of dispersive Fourier-transformation 40 is received by a means for detecting and analyzing the time-domain waveform to determine barcode patterns and/or displacements within the target being read. This detecting and analyzing means is illustrated as comprising an optical detector 42, optional filter 44, optional amplifier 46, digitizer 48, through which the time-domain waveform is directed and then analyzed by a means for performing digital signal processing 50, such as a digital signal processor implemented in any desired manner.

It should be appreciated that a broadband pulsed beam can be generated in numerous ways without departing from the teachings of the present invention. For example, the present invention is particularly well-suited for using a pulsed laser. The spectral response of the laser can be enhanced as desired in response to using a device to generate a supercontinuum.

In the embodiment shown in FIG. 2, if the laser pulse repetition rate is so high that consecutive pulses are overlapping after dispersive Fourier transformation 40, the pulse trains can be reduced by using optional pulse picker 24. In addition, an optional optical amplifier 26 may be utilized to amplify an optical pulse from pulsed laser 22 and for pumping an optional supercontinuum generator 28. The optional amplifier 26 may not be required if the initial laser 22 pulse is already powerful enough to generate the supercontinuum. Also, if the initial pulse has a very large bandwidth, the amplifier 26 and/or the supercontinuum generator 28 may not be necessary. For example, Titanium:Sapphire mode-locked lasers can generate ultra-fast pulses (<10 fs) with extremely large bandwidth (>100 nm). The supercontinuum of radiation may be passed through an optional bandpass filter 30.

The optical detector 42 is preferably an optical detector that can convert the photons from the output of the (amplified) Fourier transformation 40 into an electronic signal. The optical detector 42 may be a photodiode, an avalanche photodetector, or similar device configured for converting optical signals to electrical signals. The electronic signal from the optical detector 42 may be filtered to limit its bandwidth, such as utilizing optional electronic filter 44 and optionally amplifying that signal by electrical amplifier 46. It will be appreciated that limiting bandwidth down to only that which is necessary, limits the noise introduced into the subsequent analog to digital conversion. The signal may then be digitized by digitizer 48. The signal may also be processed or analyzed with digital signal processor 50 or computer and displayed and stored.

It can be seen that the apparatus and method can be implemented over a large range of possible probe wavelength bands. For example, high peak power probe pulses could be produced using a telecommunications laser or amplifier operating between 1300 and 1600 nm. It is also possible to frequency double (second-harmonic generation) or triple (third-harmonic generation) a telecommunications laser to produce higher frequencies for use in the apparatus. Another type of laser that could be used is the Titanium:Sapphire laser, which offers short, high-power pulses at wavelengths between 650 and 1100 nm, more typically in the vicinity of 800 nm. Although these laser types are preferred, various other types of laser sources may also be utilized.

Figure 3:
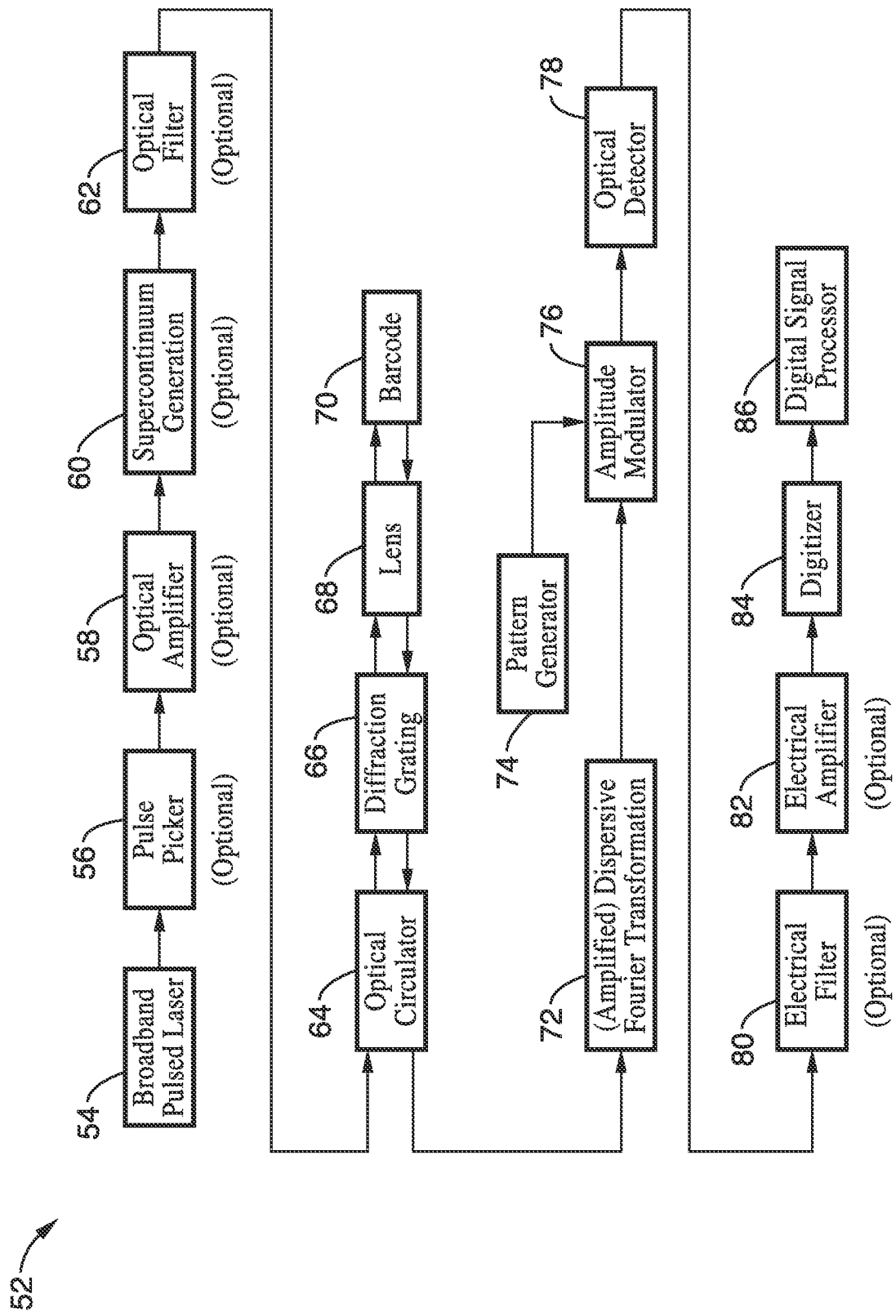
FIG. 3 is a schematic block diagram of an apparatus for performing one-dimensional dispersive Fourier-transform reflectivity measurements and database correlation matched detection according to an embodiment of the present invention.

FIG. 3 illustrates an example embodiment 52 of performing one-dimensional dispersive Fourier-transform reflectivity measurement and database correlation matched detection. It should be seen that FIG. 3 is the same as that of FIG. 2, except for the inclusion of a pattern generator 74 and an amplitude modulator 76 are used to perform correlation matched detection of barcode 70 being matched against a reference database.

A broadband pulsed probe laser 54 is directed through optional pulse picker 56, optional optical amplifier 58, optional supercontinuum generator 60, and optional optical filter 62 through an optical circulator 64, which isolates incident and reflected waves, to a diffraction grating 66 for spatially dispersing the probe beam separating its wavelengths onto a one-dimensional transverse line or elongate pattern, to lens 68 to the target barcode 70, or displacement sensing target, or targets. The reflected light from target barcode 70 passes through lens 68, grating 66 and is routed by optical circulator 64 to dispersive Fourier transform 72 to an amplitude modulator 76 which also receives a signal from a pattern generator 74. The output from amplitude modulator 76 is routed to detector 78 whose output is passed through optional filter 80 and optional amplifier 82 to a digitizer 84 and is processed by a signal processing means 86.

Pattern generator 74 generates digital barcode patterns (e.g., consisting of 0's and 1's) and feeds them into amplitude modulator 76 in the conjugate time series. The barcode patterns generated by pattern generator 74 are considered to be from a database containing information about items whose barcodes are being read by the apparatus. The transmission of amplitude modulator 76 is nulled to zero only when the barcode pattern generated by pattern generator 74 matches the pattern of barcode 70 being read. At the arrival of every pulse at the amplitude modulator, a different pattern in the database is fed into the amplitude modulator, comparing all reference barcodes in the database with the test barcode to see which one matches it.

Figure 4:
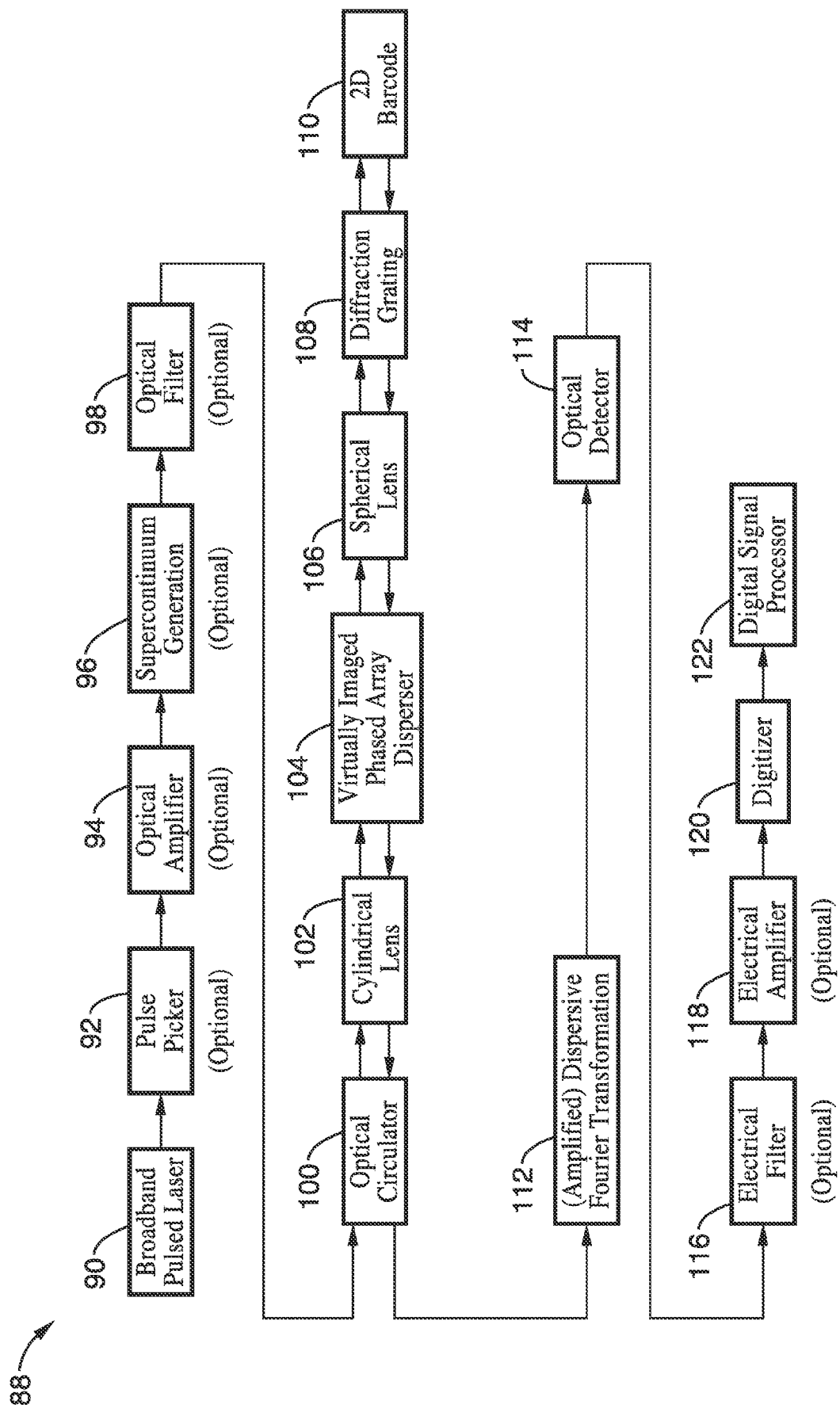
FIG. 4 is a schematic block diagram of an apparatus for performing a two-dimensional dispersive Fourier-transform reflectivity measurement according to an embodiment of the present invention.

FIG. 4 illustrates an example embodiment 88 of a two-dimensional dispersive Fourier-transform reflectivity measurement. While FIG. 2 and FIG. 3 depict schematics for performing one-dimensional reflectivity measurement, FIG. 4 shows a schematic for performing two-dimensional reflectivity measurement, and thus the reading of two-dimensional barcodes.

Referring to the figure, output of broadband pulsed laser 90 is directed through optional pulse picker 92, optional optical amplifier 94, optional supercontinuum generator 96, and optional optical filter 98 through an optical circulator 100, which isolates incident and reflected waves, to a first lens 102, disperser 104, second lens 106, and diffraction grating 108 to a target, such as two-dimensional (2D) barcode 110, or displacement sensing target, or targets. The reflected light from target 110 passes back through grating 108, lens 106, disperser 104, lens 102 and is routed by optical circulator 100 to dispersive Fourier transform 112 to an optical detector 114 whose output is passed through optional filter 116 and optional amplifier 118 to a digitizer 120 and is processed by a signal processing means 122.

Considering the elements of FIG. 4 with more particularity, this embodiment preferably focuses the broadband pulse with a cylindrical lens 102 onto the virtually imaged phased array (VIPA) disperser 104, such as comprising a glass plate with a anti-reflection coating on the front area which the beam enters, and having a high-reflectivity coating on the rest of the front side (about 100%) and a partial high-reflectivity coating on the back side (typically 95% or similar). VIPA disperser 104 produces an array of beams diverging from individual virtual images of the beam waist which is located at the point of the back surface where the first reflection of the incident beam occurs. These beams interfere and form a collimated beam, which is then focused by spherical lens 106.

Diffraction grating 108 separates degenerate frequencies of the incident beam along the direction perpendicular to the direction of the dispersion that the VIPA disperser 104 created. This produces a beam that consists of many focused points on target sample 110 (or a 2D barcode) in a two-dimensional plane. The points on the target sample 110 correspond to different frequency components of the broadband beam, forming resolvable points on the sample 110. Reflections of the different frequency components of the broadband beam from sample 110 return all the way to optical circulator 100, forming a pulse that the two-dimensional reflectivity of sample 110 is spectrally encoded into. The (amplified) dispersive Fourier-transformation 112 maps the input spectrum into a time-domain waveform. The dispersive Fourier-transformation 112 may be optically amplified to compensate for the optical loss during the transformation process. Accordingly, output of the (amplified) dispersive Fourier-transformation is the temporal waveform into which the reflection from the two-dimensional sample is spectrally encoded in a manner somewhat similar to that of a raster scan.

Figure 5:
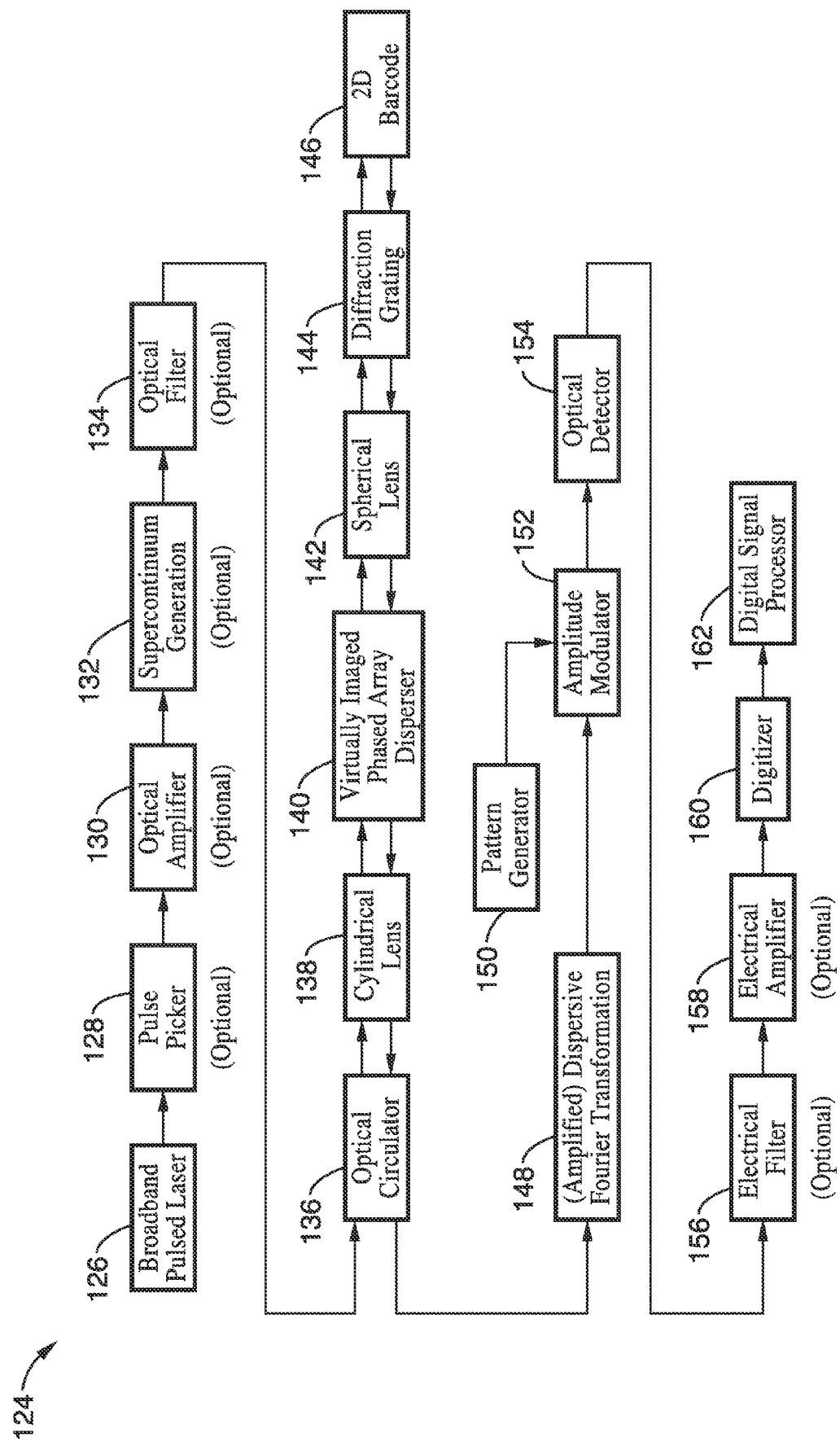
FIG. 5 is a schematic block diagram of an apparatus for performing a two-dimensional dispersive Fourier-transform reflectivity measurement and database correlation matched detection according to an embodiment of the present invention.

FIG. 5 illustrates an example embodiment 124 of two-dimensional dispersive Fourier-transform reflectivity measurement and database correlation matched detection. The acquired two-dimensional reflection image, as per the figure, has been converted into a one-dimensional temporal waveform, and can then be compared with a reference database by correlation matched detection using pattern generator 150 and amplitude modulator 152, just as they were when reading one dimensional targets like that of FIG. 3.

Referring to the figure, output of broadband pulsed laser 126 is directed through optional pulse picker 128, optional optical amplifier 130, optional supercontinuum generator 132, and optional optical filter 134 through an optical circulator 136 to a first lens 138 (e.g., cylindrical lens), a disperser 140, a second lens 142 (e.g., spherical lens), and diffraction grating 144 to a target 146, such as a two-dimensional (2D) barcode, or displacement sensing target, or targets. The reflected light from target 146 passes back through grating 144, second lens 142, disperser 140, first lens 138 and is routed by optical circulator 136 to dispersive Fourier transform 148. Output from Fourier transform 148 is directed to an amplitude modulator 152 which receives a signal input from pattern generator 150. Output from modulator 152 is directed to an optical detector 154 whose output is passed through optional filter 156 and optional amplifier 158 to a digitizer 160 for processing by digital signal processing 162.

The above embodiment is shown pictorially in a later figure (FIG. 13) illustrating two-dimensional dispersive Fourier-transform reflectivity measurement. It should again be emphasized that the sample may comprise anything of readback interest, such as the two-dimensional barcodes described by way of example and not by way of limitation.

The following discusses practical testing which was performed on embodiments of the invention.

Figure 6:
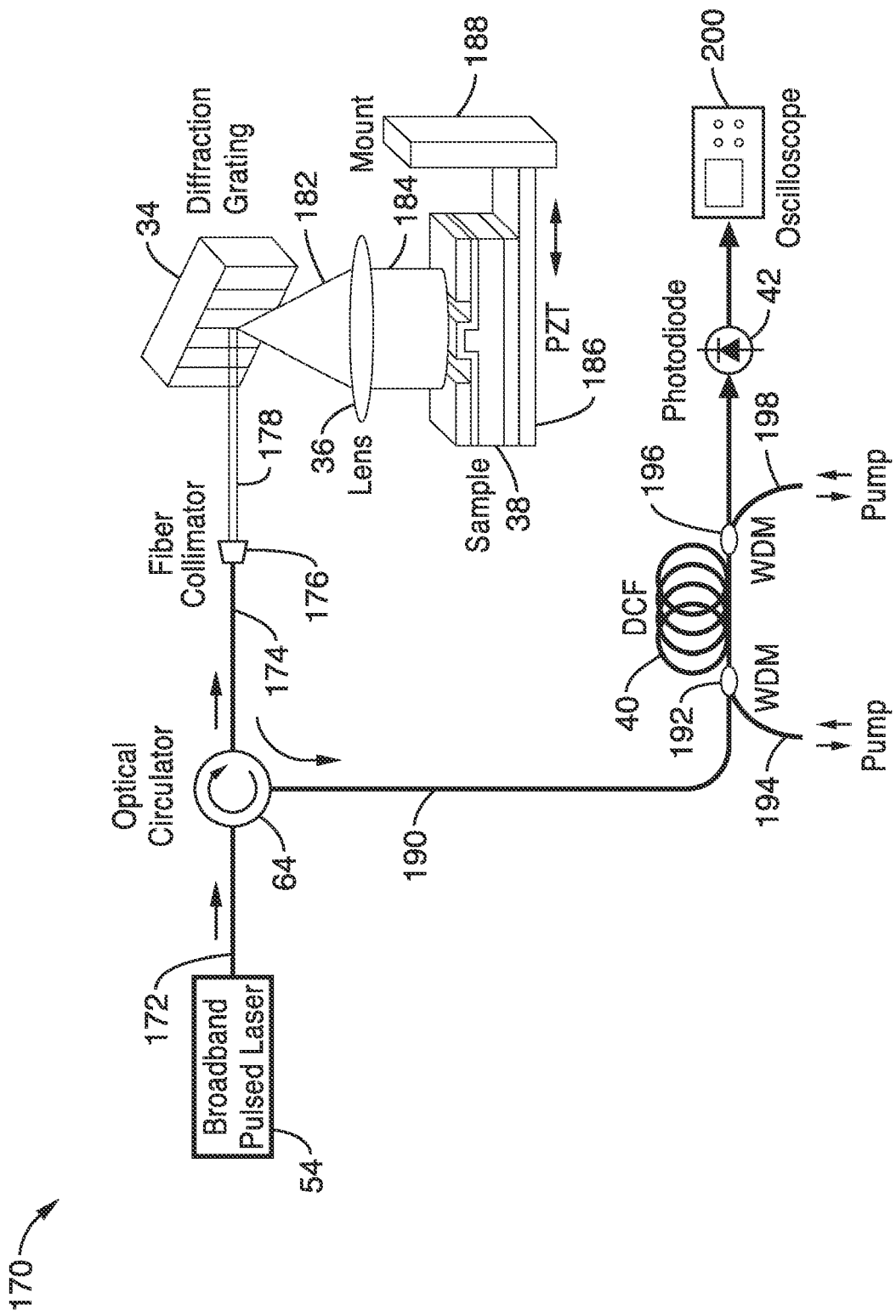
FIG. 6 is a schematic diagram of one embodiment of the dispersive Fourier-transform reflectivity measurement apparatus of FIG. 2, according to an aspect of the present invention, showing detection on a piezo-electric transducer (PZT) sample.

FIG. 6 illustrates a simplified implementation 170 of dispersive Fourier-transform reflectivity measurement apparatus of FIG. 2 using a sample on a piezo-electric transducer (PZT). Same reference numbers indicating the same functions as shown in FIG. 2. Broadband pulsed laser source 54 is coupled to a fiber 172 through optical circulator 64 through a target-side fiber 174 to a fiber collimator 176. The free space beam 178 output from collimator 176 is directed to diffraction grating 34 creating a dispersion pattern 182, passing through lens 36 and directed upon a sample 38 upon a piezoelectric translation stage 186 coupled to mount 188. As described in regard to FIG. 2 the reflected light passes back through the setup and is separated by optical circulator 64 into measurement fiber 190 from which the dispersive Fourier transformation is performed using a dispersion compensating fiber (DCF). By way of example and not limitation, DCF 40 is shown at its input with a first wavelength division multiplexer (WDM) 192 coupled to fiber 194 for attachment to a first pump source. At the output of DCF 40 is a second wavelength division multiplexer (WDM) 196 coupled to fiber 198 for attachment to a second pump source. Fourier transformation output is directed to detector 42, depicted as a photodiode, and to a measurement device 200, depicted herein as a oscilloscope. It will be recognized that in the test setup shown, the oscilloscope provides for viewing of the wave pattern and thereby evaluating if the wave patterns generated by the device can be properly registered using digital signal processing devices and methodologies. It will be clearly understood that the oscilloscope was used in the testing of the optical apparatus, while in automated applications a computer processor device would be utilized for analyzing the signals and thus reading the target in response to the signals received from the remainder of the apparatus.

The optical source 54 in this example embodiment comprised a mode-locked femtosecond fiber laser with a center wavelength of 1560 nm, a repetition rate of 100 MHz, and an average output power of 20 mW. Passing the laser light through a high nonlinearity fiber increases its bandwidth to 15 nm. The repetition rate of the laser is reduced to 25 MHz by a pulse picker (not shown in FIG. 6). After the pulse picker and the fiber optical circulator, the laser light on fiber 174 has an average power of 5 mW. The fiber collimator 176 collimates the laser light in free space onto diffraction grating 34 which in this test case has a groove density of 1200 lines/mm and a reflection efficiency of 90%. The diffraction grating spatially disperses the broadband light by separating the wavelengths of the probe beam.

Figure 7:
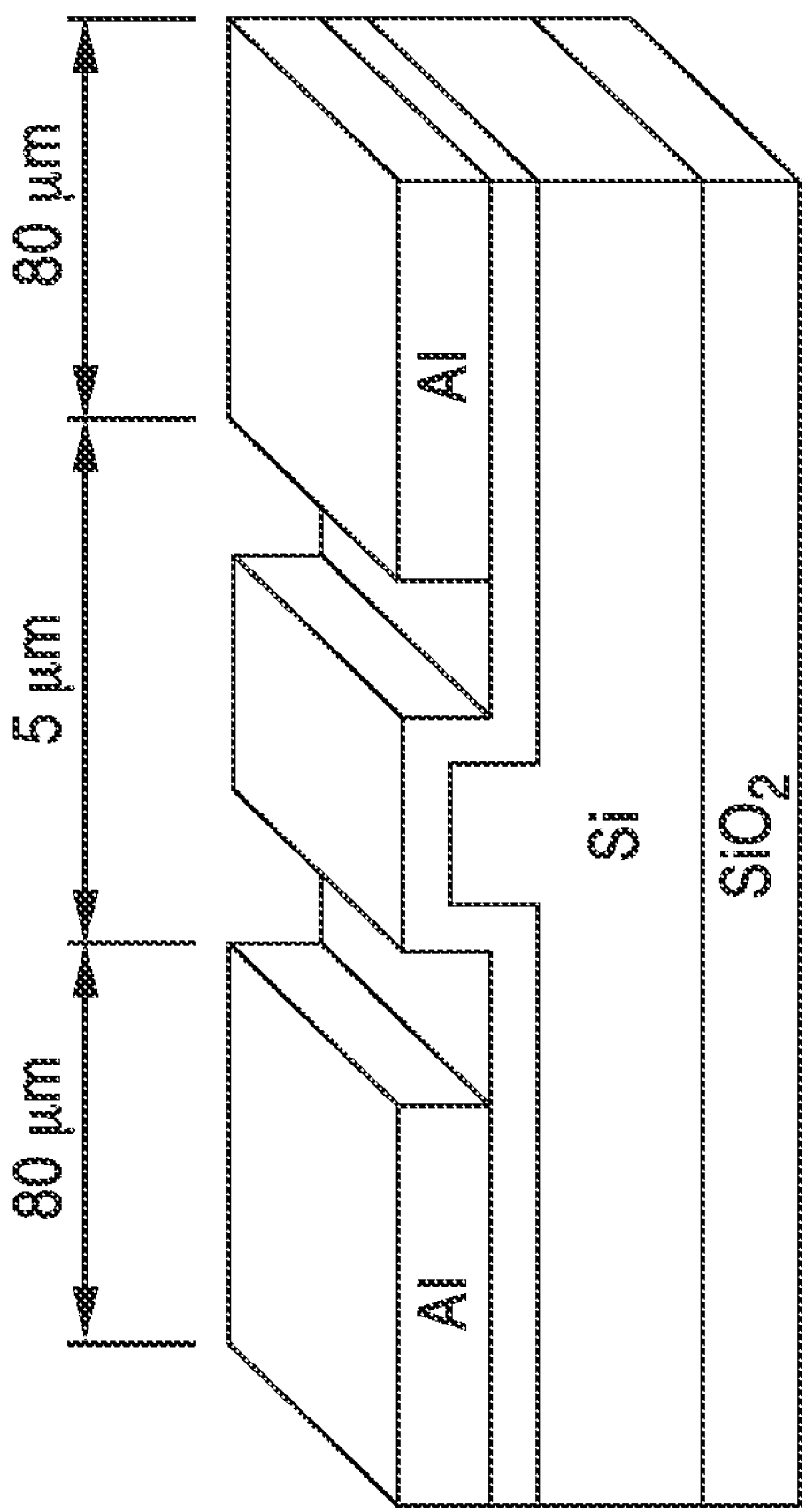
FIG. 7 is an orthogonal view of a test sample, specifically a silicon waveguide protected by silicon dioxide with two adjacent thin aluminum films, illustrating the use of the present invention with targets other than barcodes.

FIG. 7 depicts the target shown in FIG. 6 which by way of example comprises a silicon waveguide, with Si protected by silicon dioxide, and having adjacent thin aluminum films. The aluminum film sections in this example are shown as 80 μm wide with a silicon fin in between of 5 μm. The silicon and silicon dioxide are transparent and the aluminum films are high-reflective around 1560 nm. Since the invention is amenable for use with a wide range of target types and sizes, the measurements of the target recited above are only important insofar as they allow understanding of how the measured results, described below, relate to the specific target being read.

Figure 8:
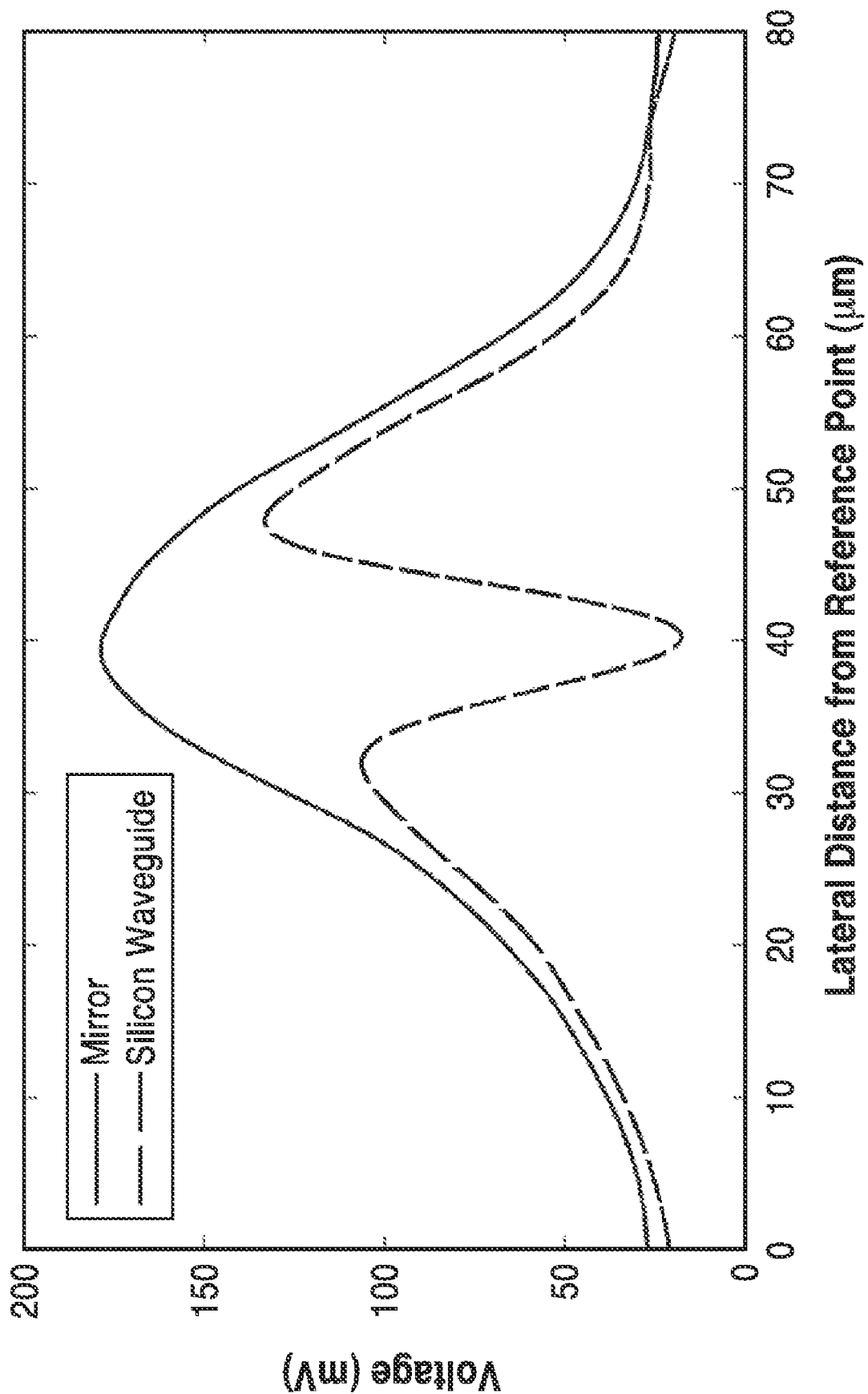
FIG. 8 is a graph comparing reflected probe light spectra from the sample according to an aspect of the present invention, in comparison with reflected light from a mirror used as a reference.

FIG. 8 is a graph depicting a comparison of the spectra of reflected probe light from the FIG. 7 sample, and a mirror used as a reference. The spatially dispersed beam is collimated by a lens onto a sample, which in this example is the silicon waveguide of FIG. 7. The silicon waveguide sample is mounted on a piezo-electric transducer (PZT), as shown in FIG. 6, which is connected to an optical mount having a large mass.

The pulsed laser is directed onto sample 38 as shown in FIG. 6, and the reflection returns to fiber collimator 176 through diffraction grating 34. The optical circulator guides the reflected light toward dispersion compensation fiber (DCF) with a dispersion of −1512 ps/nm and an optical loss of 9 dB. The DCF maps the input spectrum, which is the spectrally encoded one-dimensional transverse reflectivity profile of the sample, into a time-domain waveform. Wavelength-division multiplexers (WDMs) combine, (first WDM) and remove (second WDM), a Raman pump at 1470 nm with, and from, the reflected light before and after the DCF.

A photodetector, such as with a response time of 50 ps in this example, is used to detect the temporally dispersed output of the DCF. According to the formula given by D. Yelin, I. Rizvi, W. M. White, J. T. Motz, T. Hasan, B. E. Bouma, and G. J. Tearney, in "Three-dimensional miniature endoscopy," Nature 443, 765 (2006), the number of resolvable points is about 64 based on the groove density of the grating, the center wavelength, bandwidth, and diameter of the probe beam, and Littrow's angle. Based on the repetition rate of the laser (25 MHz), the time resolution of this dispersive Fourier-transform imaging device is 40 ns.

In FIG. 8 the spectrum of the reflected light for a dielectric mirror sample is shown as the upper bell-shaped curve, while the spectrum for the silicon waveguide appears in the lower curve having the 'notch', or 'dip' in the middle of the curve. The wavelength shown in the graph is calibrated to distance in the X axis. Comparing the two spectra, the one with the silicon waveguide clearly shows a dip that corresponds to the low reflectivity part of the sample, that is, the silicon waveguide covered by silicon dioxide shown in FIG. 7.

Figure 9:
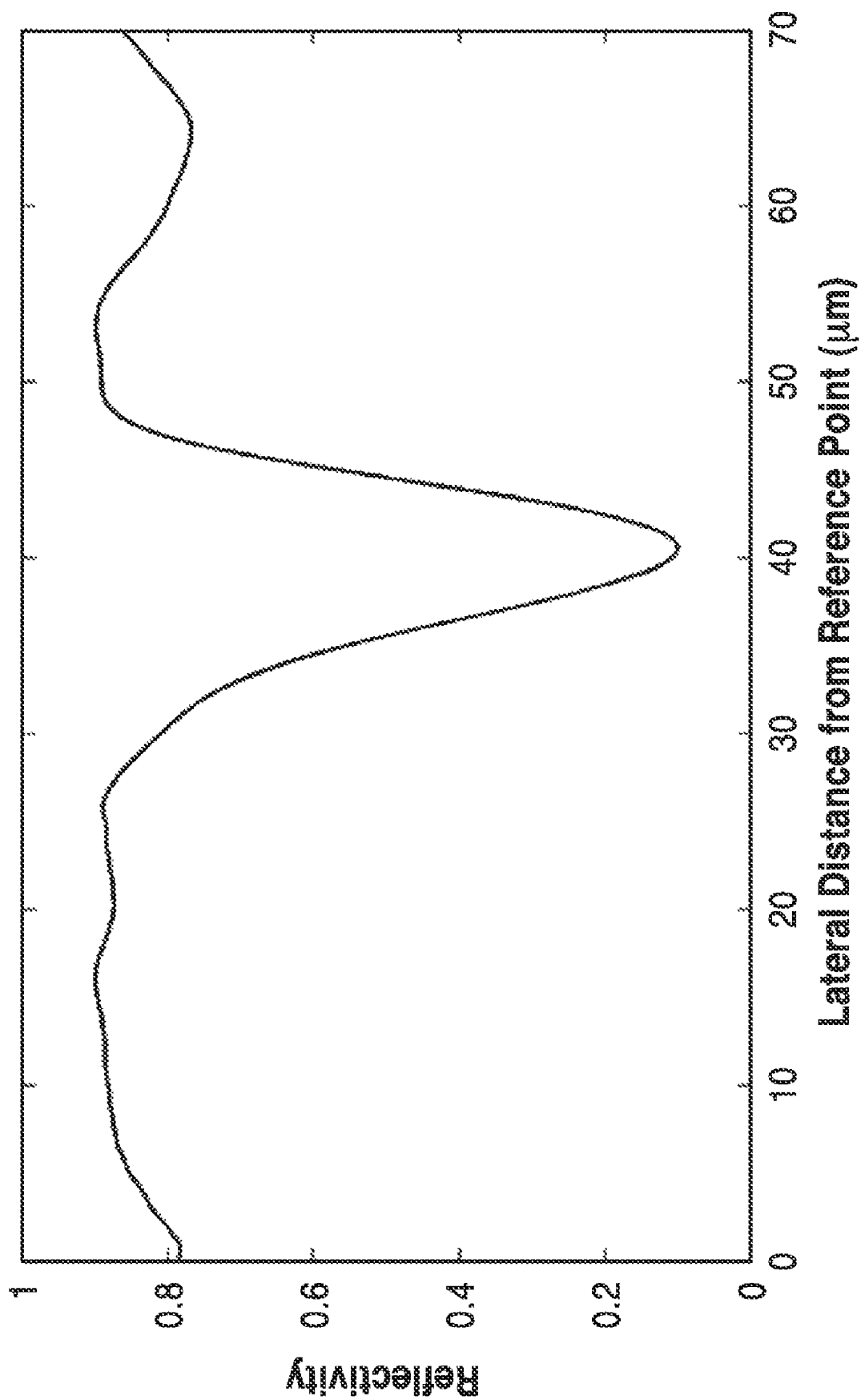
FIG. 9 is a graph of a calibrated reflectivity profile for the sample shown in FIG. 7, according to an aspect of the present invention.

FIG. 9 depicts the calibrated reflectivity profile of the sample in FIG. 7, in response to measurements depicted in FIG. 8. It will be noted that a very pronounced peak arises about 40 μm.

Figure 10:
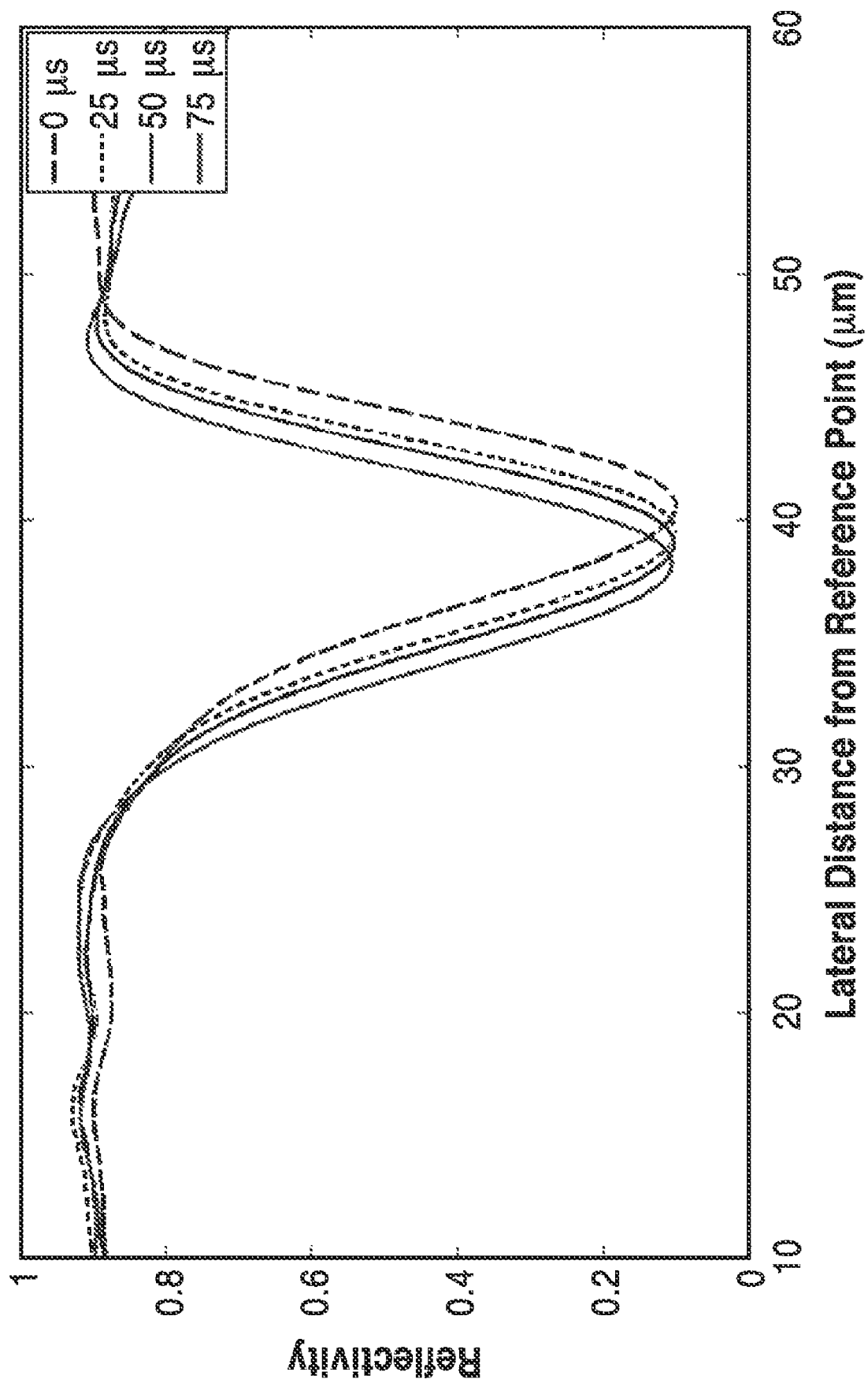
FIG. 10 is a graph of the calibrated reflectivity profile for the sample in FIG. 7, according to an aspect of the present, shown in response to physical translation (motion) of the sample being scanned.

FIG. 10 depicts another graph of calibrated reflectivity profile of the sample in FIG. 7 based on measurement taken in the test setup of FIG. 6 at different times when the sample is laterally scanned by use of the piezo-electric translation stage. The calibrated reflectivity profile of the measured sample is shown at four different times (0 μs, 25 μs, 50 μs, and 75 μs) when the PZT is scanned with a ramp function so that the PZT translates the sample in the direction shown in FIG. 6. The silicon waveguide transmits most of the probe beam whereas the aluminum films reflects it back toward the optical source. Although the image acquisition period is 40 nm, only one out of every 625 scans (one scan every 25 μs) is plotted here for clarity. The fast displacement of the sample was clearly captured.

Figure 11:
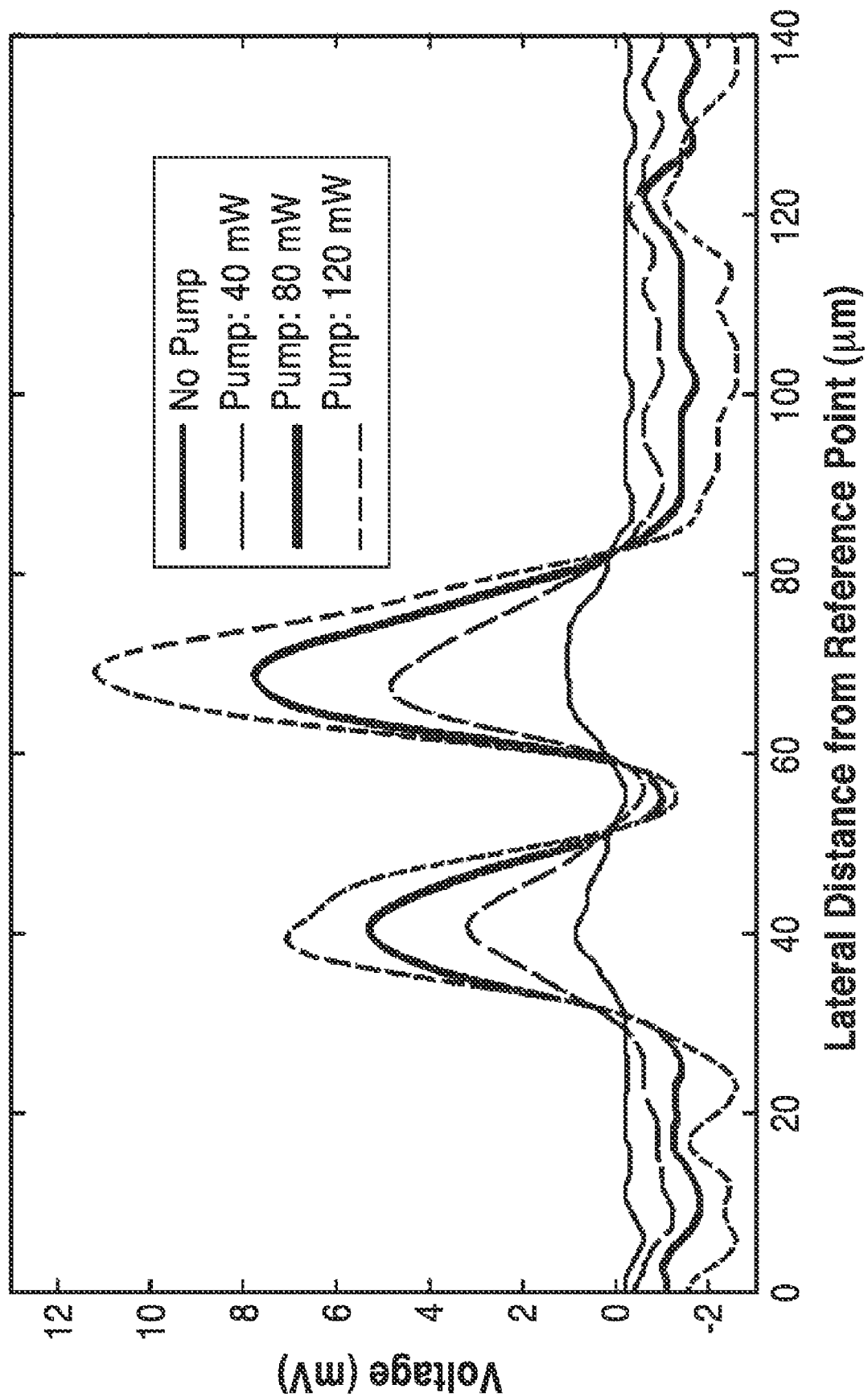
FIG. 11 is a graph of the spectrum from the reflected probe light off of the sample shown in response to different levels of amplification according to an aspect of the present invention.

FIG. 11 depicts the spectrum of reflected probe light from the sample of FIG. 7, with and without distributed Raman amplification in the dispersive fiber at different levels of pump powers. When the sample is a weak reflector, the weak reflection signal may be masked by the electronic noise of the photodetector. The figure illustrates that the signal-to-noise ratio can be increased by optically amplifying the power of the weak reflected light. In this demonstration, distributed Raman amplification is used to boost the weak reflection signal well above the detector noise. The signal growth at different pump powers (40 mW, 80 mW, and 120 mW) is evident in the figure.

Figure 12:
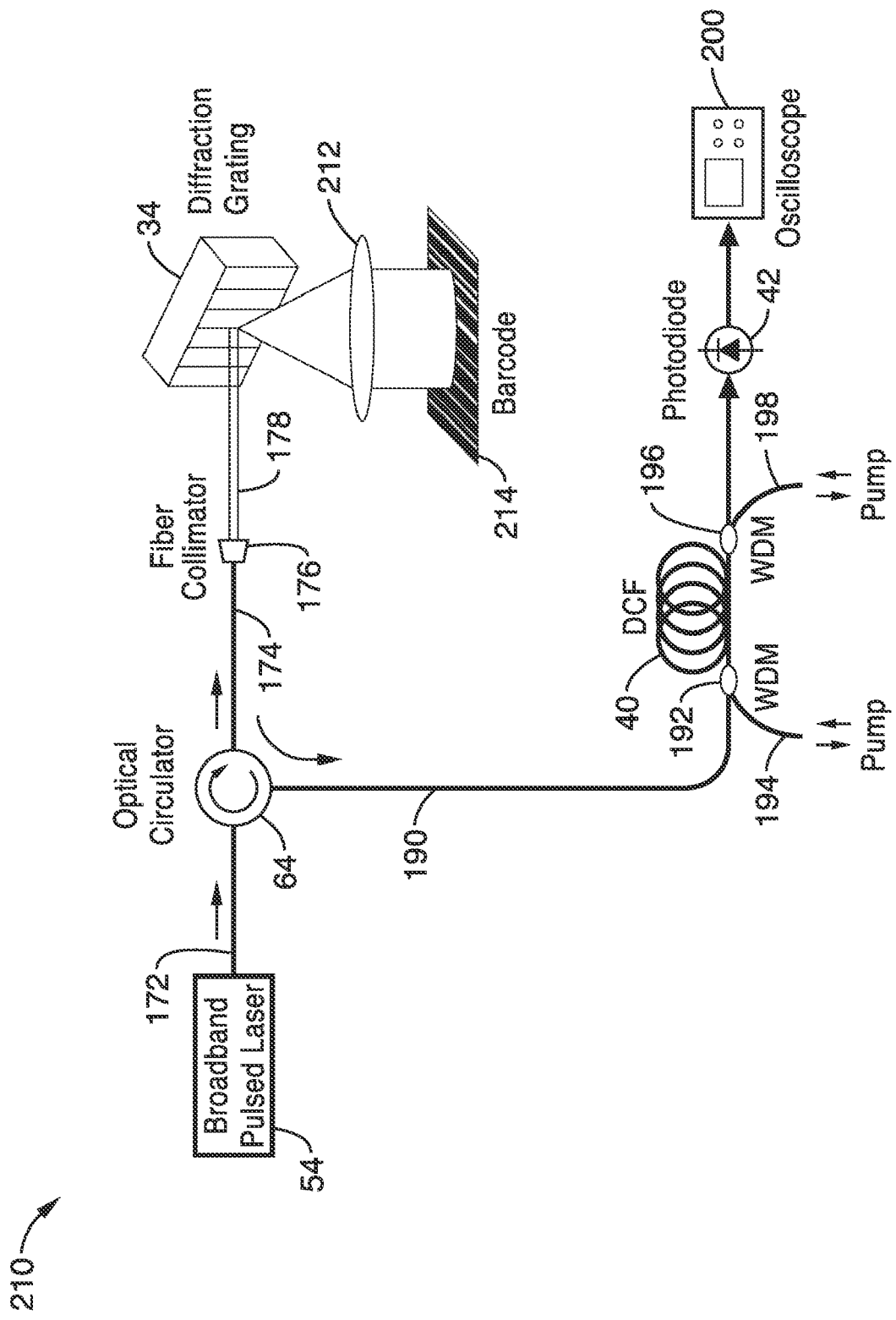
FIG. 12 is a schematic diagram of the dispersive Fourier-transform barcode reading measurement of FIG. 2, shown according to an embodiment of the present invention.

FIG. 12 illustrates an example embodiment 210 of the dispersive Fourier-transform barcode reading apparatus of FIG. 2, while the apparatus is similar to that shown in FIG. 6, except for the use of a different focusing lens and directing the apparatus to a different target, specifically a barcode sample. The focusing lens in FIG. 6 was replaced with a spherical lens in FIG. 11, such as having a focal length of 100 mm in this example. Considering this example, beam expansion was changed to increase the spot size on the diffraction grating. These modifications resulted in an increased number of resolvable points (145). Here in this example, a barcode is utilized as a sample to demonstrate ultrafast barcode reading.

In this simplified implementation 210 of dispersive Fourier-transform reflectivity measurement apparatus directed to a barcode sample. Use of the same reference numbers denote the same functions. A broadband pulsed laser source 54 is coupled to a fiber 172 through optical circulator 64 through a target-side fiber 174 to a fiber collimator 176. The free space beam 178 output from collimator 176 is directed to diffraction grating 34 creating a dispersion pattern 182, passing through lens 212 and directed upon a barcode 214. Reflected light passes back through the setup and is separated by optical circulator 64 into measurement fiber 190 from which the dispersive Fourier transformation is performed using a dispersion compensating fiber (DCF). By way of example and not limitation, DCF 40 is shown at its input with a first wavelength division multiplexer (WDM) 192 coupled to fiber 194 for attachment to a first pump source. At the output of DCF 40 is a second wavelength division multiplexer (WDM) 196 coupled to fiber 198 for attachment to a second pump source. Fourier transformation output is directed to detector 42, depicted as a photodiode, and to a measurement device 200, depicted herein as a oscilloscope. It will be recognized that in the test setup shown the oscilloscope provides for viewing of the wave pattern and thereby evaluating if the wave patterns generated by the device can be properly registered using digital signal processing devices and methodologies.

Figure 13:
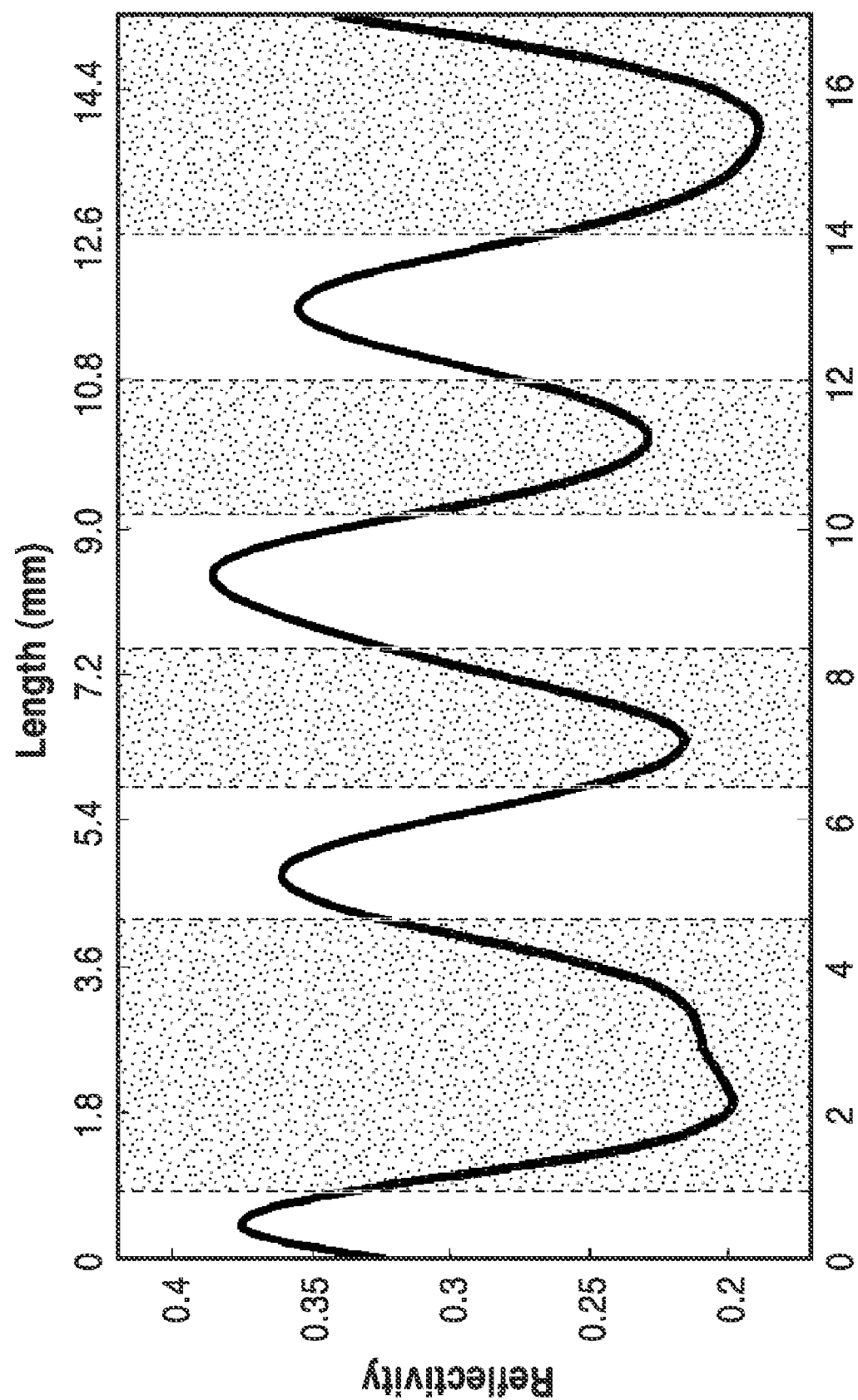
FIG. 13 is a graph of a single-shot one-dimensional barcode measurement according to an aspect of the present invention, shown with a background of the bars as present in the sample barcode.

FIG. 13 depicts the waveform response from the test setup of FIG. 12, wherein a graph of a single-shot one-dimensional barcode measurement is shown with a background of the sample barcode. In this example, the barcode sample is composed of a transparent film with black bars printed on it. The figure also shows the calibrated reflectivity profile of the measured barcode with the calibrated length axis above the figure. The measured reflectivity profile is readily compared (good agreement) with the barcode sample showing 1001010100 within only 17 ns. The scan rate is 25 MHz, indicating that a scan takes only 40 ns. This demonstration firmly establishes the feasibility of dispersive Fourier-transform barcode reading according to embodiments of the present invention.

Figure 14:
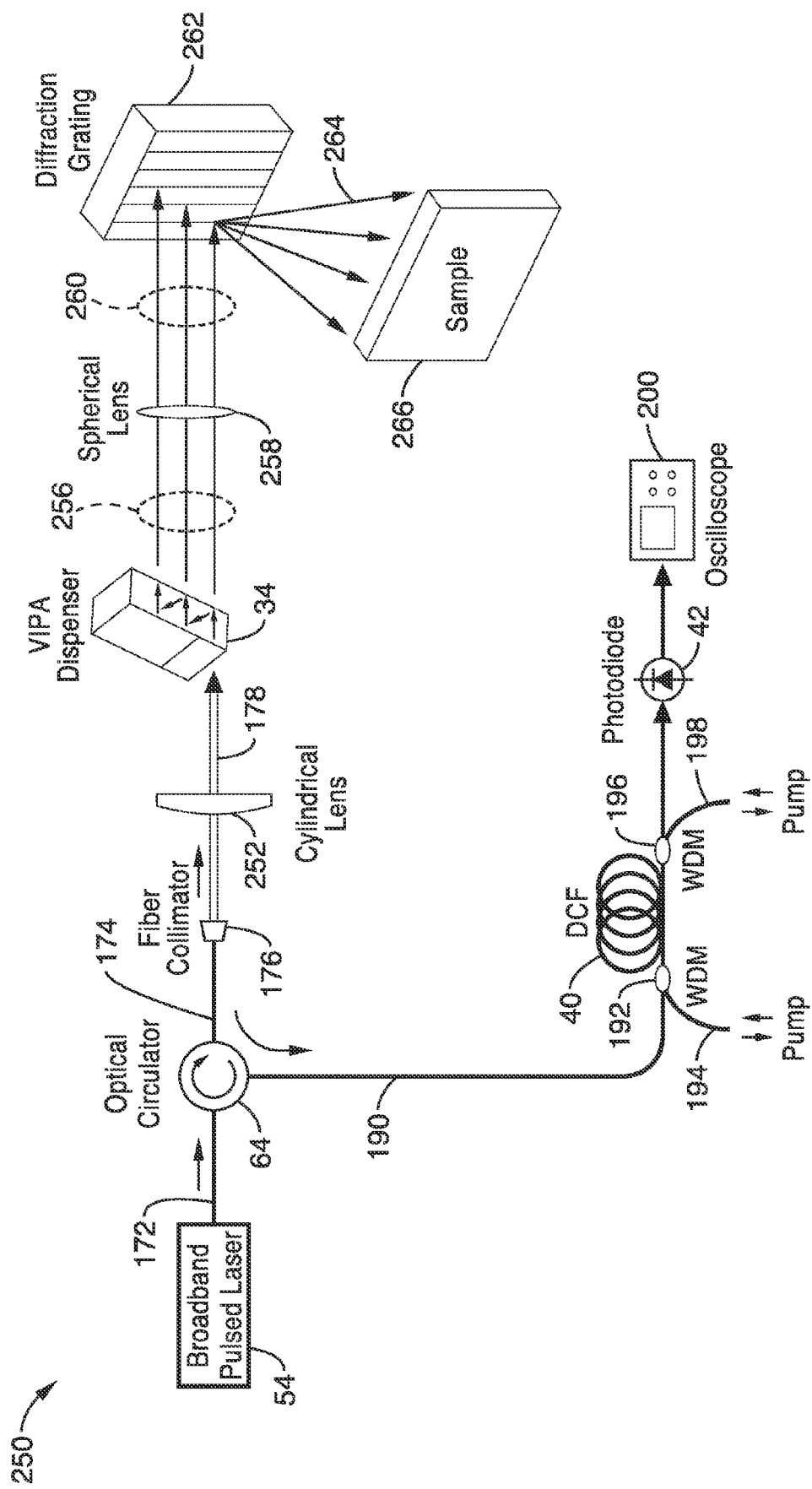
FIG. 14 is a schematic diagram of the two-dimensional dispersive Fourier-transform reflectivity measurement of FIG. 4, shown according to an embodiment of the present invention.

FIG. 14 illustrates an example embodiment 250 of a two-dimensional dispersive Fourier-transform reflectivity measurement as shown in FIG. 4. In this simplified implementation of dispersive Fourier-transform reflectivity measurement apparatus is directed to a two dimensional barcode or other sample.

Use of the same reference numbers denote the same functions. A broadband pulsed laser source 54 is coupled to a fiber 172 through optical circulator 64 through a target-side fiber 174 to a fiber collimator 176. The free space beam 178 output from collimator 176 is directed through a first lens 252, preferably cylindrical, to a high resolution virtually-imaged phased array (VIPA) disperser 254 whose output 256 is directed through a second lens 258, preferably spherical, striking diffraction grating 262 creating a 2D rainbow or dispersion pattern 264, which strikes sample 266. Reflected light passes back through the setup and is separated by optical circulator 64 into measurement fiber 190 from which the dispersive Fourier transformation is performed using a dispersion compensating fiber (DCF). By way of example and not limitation, DCF 40 is shown at its input with a first wavelength division multiplexer (WDM) 192 coupled to fiber 194 for attachment to a first pump source. At the output of DCF 40 is a second wavelength division multiplexer (WDM) 196 coupled to fiber 198 for attachment to a second pump source. Fourier transformation output is directed to detector 42, depicted as a photodiode, and to a measurement device 200, depicted herein as a oscilloscope. It will be recognized that in the test setup shown, the oscilloscope provides for viewing of the wave pattern and thereby evaluating if the wave patterns generated by the device can be properly registered using digital signal processing devices and methodologies. The detected 1D time-domain data is digitally sorted into a 2D matrix, representing a 2D image of the sample.

Figure 15:
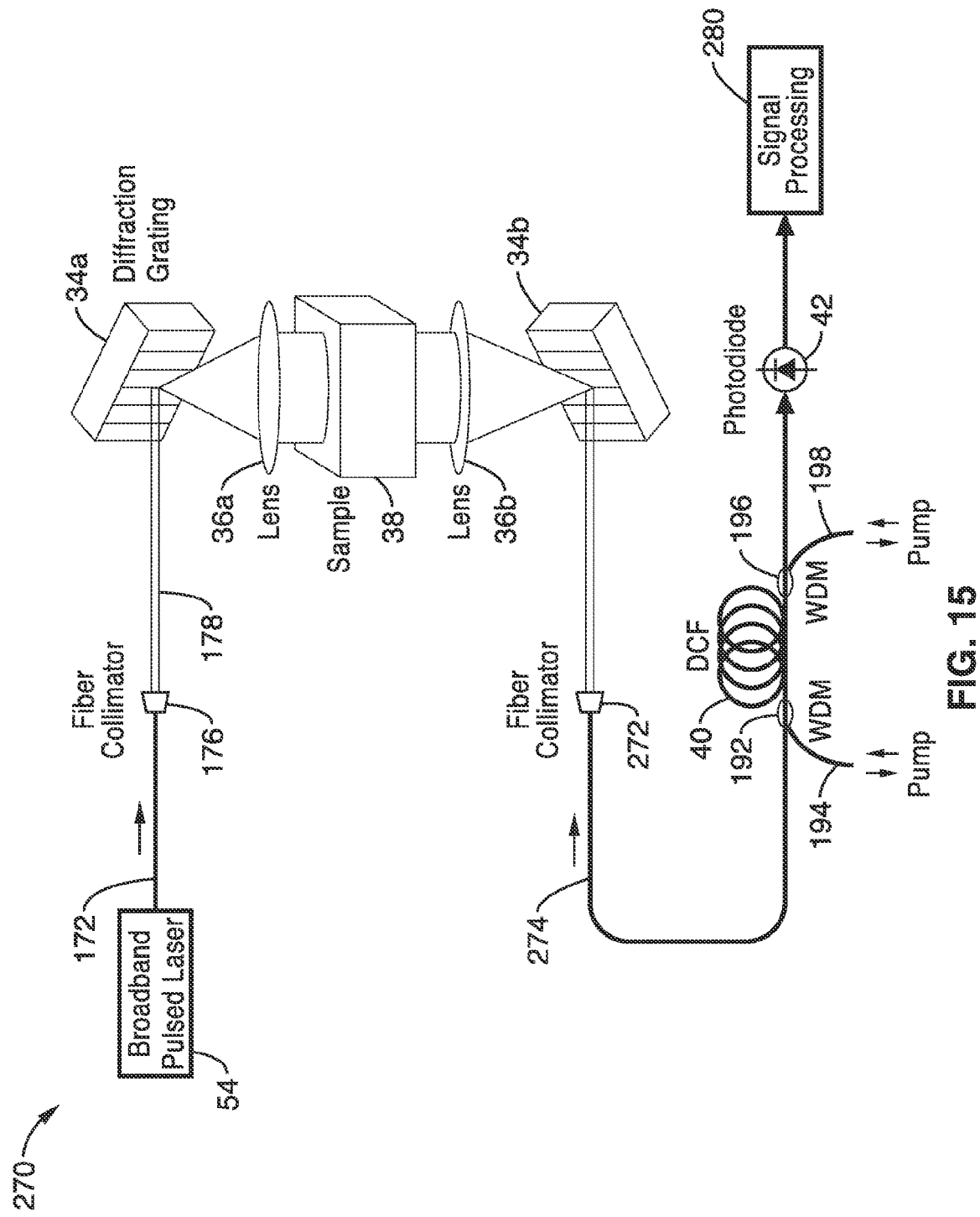
FIG. 15 is a schematic diagram of a dispersive Fourier-transform transmissivity measurement showing according to an embodiment of the present invention.

FIG. 15 illustrates a simplified implementation 270 of a dispersive Fourier-transform transmissivity measurement apparatus, which is similar to that shown in FIG. 6 and others, while directed to reading the transmitted light passing through the sample, instead of the reflected light. It should also be appreciated that reading of transmitted light can be combined with embodiments which read reflected light, so that both reflected and transmitted light can be registered, as may be suited to select applications of the technology. The sample 38 is shown as a space within which the sample is retained, contained, or passes through, during analysis. It should be appreciated, that as in each of the other embodiments, the sample may be a coded surface, a solid material, a liquid, or a gaseous material, or combinations thereof.

Same reference numbers indicate the same functions as shown in other figures. A broadband pulsed laser source 54 is coupled to a fiber 172 to a fiber collimator 176. The free space beam 178 output from collimator 176 is directed to a first diffraction grating 34a creating a dispersion pattern 182, passing through a first lens 36a and directed upon a sample 38. Light that is transmitted through sample 38 is directed through a second lens 36b, onto a second diffraction grating 34b and onto collimator 272 and measurement fiber 274 from which the dispersive Fourier transformation is performed using a dispersion compensating fiber (DCF) 40. By way of example and not limitation, DCF 40 is shown at its input with a first wavelength division multiplexer (WDM) 192 coupled to fiber 194 for attachment to a first pump source. At the output of DCF 40 is a second wavelength division multiplexer (WDM) 196 coupled to fiber 198 for attachment to a second pump source. Fourier transformation output is directed to detector 42, depicted as a photodiode, and to a signal processing device 280.

Accordingly, it will be appreciated that the light transmitted through the sample can be generally thought of as the complement of the reflected light, since light impinging on the sample is either reflected, or transmitted (unless it is absorbed, which only occurs in select forms of samples). Variations of the setup shown in FIG. 15 can also be adapted for interferometry, in which the phase of transparent objects is detected by the signal processing apparatus in response to the light received through rest of the apparatus.

The following section summarizes, by way of example and not limitation, a number of implementations, modes and features described herein for the present invention. The present invention provides methods and apparatus for reading a target in one or more dimensions to which a pulsed probe beam is directed. Inventive teachings can be applied in a variety of apparatus and applications. The present invention includes the following inventive embodiments among others:

1. An apparatus for reading barcodes and sensing displacements, comprising: (a) means for generating a broadband pulsed probe beam; (b) means for Fourier-transformation mapping of the spectrum of said pulsed probe beam into a spatial domain directed at a target to be read based on its responsive optical signal; (c) means for dispersive Fourier-transformation of said responsive optical signal to convert said responsive optical signal into a time-domain waveform; and (d) means for detecting and analyzing said time-domain waveform to determine barcode patterns and/or displacements within the target being read.

2. An apparatus as recited in embodiment 1, wherein said responsive optical signal is created in response to optical energy which is reflected from the target to said means for dispersive Fourier-transformation, or optical energy that is transmitted through the target to said means for dispersive Fourier-transformation.

3. An apparatus as recited in embodiment 1, wherein said probe beam and said responsive optical signal are carried through free-air, optical fiber, or through a combination of free-air and optical fiber.

4. An apparatus as recited in embodiment 1, wherein said means for generating said broadband pulsed probe beam comprises a laser configured to generate pulses.

5. An apparatus as recited in claim 1, further comprising means for picking selected pulses from a train of pulses generated by said means for generating a broadband pulsed probe beam.

6. An apparatus as recited in embodiment 1, further comprising means for amplification and/or filtering coupled to said means for generating a broadband pulsed probe beam for increasing the signal-to-noise ratio and detection sensitivity of said pulsed probe beam.

7. An apparatus as recited in embodiment 1, wherein said means for generating a broadband pulsed probe beam comprises means for supercontinuum generation for broadening the spectral bandwidth of light emanating from an optical source.

8. An apparatus as recited in embodiment 1, wherein said means for Fourier-transformation mapping of the spectrum into the spatial domain comprises a dispersive element.

9. An apparatus as recited in embodiment 1, wherein said means for Fourier-transformation mapping is performed by a dispersive element comprising a diffraction grating to separate the wavelength of said pulsed probe beam.

10. An apparatus as recited in embodiment 1, wherein said means for Fourier-transformation mapping is performed by a dispersive element comprising a prism.

11. An apparatus as recited in embodiment 1, wherein said means for Fourier-transformation mapping is performed by a dispersive element comprising a virtually imaged phased array disperser.

12. An apparatus as recited in embodiment 1, further comprising means for separating said pulsed probe beam directed toward the target, from a responsive optical signal returning from the target.

13. An apparatus as recited in embodiment 1, wherein said means for dispersive Fourier-transformation to convert said responsive optical signal into a time-domain waveform comprises an element for inducing group-velocity dispersion (GVD).

14. An apparatus as recited in embodiment 1, wherein said means for dispersive Fourier-transformation comprises a dispersive element and/or chirped optical element for inducing group-velocity dispersion (GVD) in converting said responsive optical signal into a time-domain waveform.

15. An apparatus as recited in embodiment 1, wherein said means for detecting and analyzing said time-domain waveform comprises: (a) at least one photo responsive element; (b) a digitizer coupled to said photo responsive element, said digitizer configured for converting the optical waveform into a digital signal; and (c) a digital signal processor configured for analyzing said digital signal to read the target.

16. An apparatus as recited in embodiment 1, further comprising optical amplification and/or filtering before, within, or after said means for dispersive Fourier-transformation.

17. An apparatus as recited in embodiment 1, further comprising: optical amplification and/or filtering before, within, or after said means for dispersive Fourier-transformation; wherein said optical amplification is performed using stimulated Raman scattering, a semiconductor amplifier, or a fiber amplifier.

18. An apparatus as recited in embodiment 1, further comprising: a fiber amplifier disposed before, within, or after said means for dispersive Fourier-transformation; and a continuous-wave light or pulsed light pumping said fiber amplifier.

19. An apparatus as recited in embodiment 1, further comprising means for performing optical database correlation matched detection on the target.

20. An apparatus as recited in embodiment 1, further comprising: an electro-optic modulator disposed prior to conversion of said responsive optical signal to an electrical signal; and a database coupled to said electro-optic modulator for controlling optical modulation; wherein an expected barcode pattern is received from the database and its conjugate applied to said electro-optic modulator; and wherein correlation matched detection of the target to the database is realized in response to whether or not the responsive optical signal being detected has a correlation peak.

21. An apparatus as recited in embodiment 1, wherein said means for performing optical database correlation comprises: (a) a pattern generator configured for generating correlation patterns based on information from a database a set of targets within which should be found the current target; (b) an amplitude modulator coupled to said pattern generator, said amplitude modulator configured for modulating the responsive optical signal; and (c) means for threshold sensing of the amplitude modulated responsive optical signal to indicate positive or negative correlation between the target and correlation pattern received from said database used for modulating the amplitude of said responsive optical signal.

22. An apparatus as recited in embodiment 1, wherein said apparatus is configured for reading the target in either one dimension or two dimensions.

23. An apparatus as recited in embodiment 1, wherein said apparatus is configured for reading the target as a barcode used in tracking of commercial items, serial control of printed-circuit boards, traceability control of HDD parts, automatic sorting in conveyor lines, tracking of PC media drives, or wafer production.

24. An apparatus as recited in embodiment 1, wherein said apparatus is configured for reading the target in an application selected from the group of application fields consisting of bioinformatics, tracking of medical specimens, tracking stem cell banks, sperm banks, and/or use in DNA sequence banks.

25. An apparatus as recited in embodiment 1, wherein said apparatus is configured for reading the target in performing high-speed displacement sensing on that target.

26. An apparatus as recited in embodiment 1: wherein said apparatus is configured for reading the target in performing high-speed displacement sensing on that target; and wherein high-speed displacement sensing comprises measurement of rough surfaces and/or measurement of width and gap.

27. An apparatus as recited in embodiment 1, wherein said apparatus is configured for performing flow cytometry by detecting and/or measuring the motion of particles within a fluid.

28. An apparatus as recited in embodiment 1, wherein said apparatus is configured for reading the target in response to reflective differences encoded within optical storage media.

29. An apparatus as recited in embodiment 1: wherein said apparatus is configured for reading the target which comprises reflective differences encoded within optical storage media; and wherein said optical storage media is formatted according to a desired storage protocol selected from the group of protocols used to encode CD, DVD, and Blu-ray discs.

30. An apparatus as recited in embodiment 1, wherein said apparatus is configured for detection the presence or absence of physical objects.

31. An apparatus, comprising: (a) a broadband optical source configured for generating a pulsed probe beam; (b) a spectral encoder configured for converting said pulsed probe beam into a spatial domain and directing it at a target to be read; (c) a spatial decoder configured for converting the spatial domain, of light reflected from, or transmitted through, the target and into a time-domain; and (d) a signal processor configured for detecting and analyzing the time-domain waveform to read patterns and/or determine displacements within the target.

32. A method of reading patterns and determining displacements of a target, comprising: (a) generating a pulsed probe beam from a broadband optical source; (b) converting said pulsed probe beam into a spatial domain; (c) directing said spatial domain pulsed probe beam at a target to be read; (d) converting the spatial domain of light from the target being read into a time-domain waveform; and (e) detecting and analyzing said time-domain waveform, within a processor configured for executing program instructions from memory, to read patterns and/or determine displacements within the target.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for reading barcodes and sensing displacements, comprising:
    means for generating a broadband pulsed probe beam;
    means for Fourier-transformation mapping of the spectrum of said pulsed probe beam into a spatial domain directed at a target to be read based on its responsive optical signal;
    means for dispersive Fourier-transformation of said responsive optical signal to convert said responsive optical signal into a time-domain waveform; and
    means for detecting and analyzing said time-domain waveform to determine barcode patterns and/or displacements within the target being read;
    wherein said apparatus is configured for: (1) reading the target in an application selected from the group of application fields consisting of bioinformatics, tracking of medical specimens, tracking stem cell banks, sperm banks, and/or use in DNA sequence banks; (2) performing flow cytometry by detecting and/or measuring the motion and morphological features of particles within a fluid; and/or (3) reading the target which comprises reflective differences encoded within optical storage media formatted according to a desired storage protocol selected from the group of protocols used to encode CD, DVD, and Blu-ray discs.

2. An apparatus as recited in claim 1, wherein said responsive optical signal is created in response to optical energy which is reflected from the target to said means for dispersive Fourier-transformation, or optical energy that is transmitted through the target to said means for dispersive Fourier-transformation.

3. An apparatus as recited in claim 1, wherein said probe beam and said responsive optical signal are carried through free-air, optical fiber, or through a combination of free-air and optical fiber.

4. An apparatus as recited in claim 1, wherein said means for generating said broadband pulsed probe beam comprises a laser configured to generate pulses.

5. An apparatus as recited in claim 1, further comprising means for picking selected pulses from a train of pulses generated by said means for generating a broadband pulsed probe beam.

6. An apparatus as recited in claim 1, further comprising means for amplification and/or filtering coupled to said means for generating a broadband pulsed probe beam for increasing the signal-to-noise ratio and detection sensitivity of said pulsed probe beam.

7. An apparatus as recited in claim 1, wherein said means for generating a broadband pulsed probe beam comprises means for supercontinuum generation for broadening the spectral bandwidth of light emanating from an optical source.

8. An apparatus as recited in claim 1, wherein said means for Fourier-transformation mapping of the spectrum into the spatial domain comprises a dispersive element.

9. An apparatus as recited in claim 1, wherein said means for Fourier-transformation mapping is performed by a dispersive element comprising a diffraction grating to separate the wavelength of said pulsed probe beam.

10. An apparatus as recited in claim 1, wherein said means for Fourier-transformation mapping is performed by a dispersive element comprising a prism.

11. An apparatus as recited in claim 1, wherein said means for Fourier-transformation mapping is performed by a dispersive element comprising a virtually imaged phased array disperser.

12. An apparatus as recited in claim 1, further comprising means for separating said pulsed probe beam directed toward the target, from a responsive optical signal returning from the target.

13. An apparatus as recited in claim 1, wherein said means for dispersive Fourier-transformation to convert said responsive optical signal into a time-domain waveform comprises an element for inducing group-velocity dispersion (GVD).

14. An apparatus as recited in claim 1, wherein said means for dispersive Fourier-transformation comprises a dispersive element and/or chirped optical element for inducing group-velocity dispersion (GVD) in converting said responsive optical signal into a time-domain waveform.

15. An apparatus as recited in claim 1, wherein said means for detecting and analyzing said time-domain waveform comprises:
    at least one photo responsive element;
    a digitizer coupled to said photo responsive element, said digitizer configured for converting the optical waveform into a digital signal; and
    a digital signal processor configured for analyzing said digital signal to read the target.

16. An apparatus as recited in claim 1, further comprising optical amplification and/or filtering before, within, or after said means for dispersive Fourier-transformation.

17. An apparatus as recited in claim 1, further comprising:
    optical amplification and/or filtering before, within, or after said means for dispersive Fourier-transformation;
    wherein said optical amplification is performed using stimulated Raman scattering, a semiconductor amplifier, or a fiber amplifier.

18. An apparatus as recited in claim 1, further comprising:
    a fiber amplifier disposed before, within, or after said means for dispersive Fourier-transformation; and
    a continuous-wave light or pulsed light pumping said fiber amplifier.

19. An apparatus as recited in claim 1, further comprising means for performing optical database correlation matched detection on the target.

20. An apparatus as recited in claim 1 claim 19, further comprising:
    an electro-optic modulator disposed prior to conversion of said responsive optical signal to an electrical signal; and
    a database coupled to said electro-optic modulator for controlling optical modulation;

wherein an expected barcode pattern is received from the database and its conjugate applied to said electro-optic modulator; and wherein correlation matched detection of the target to the database is realized in response to whether or not the responsive optical signal being detected has a correlation peak.

21. An apparatus as recited in claim 1 claim 19, wherein said means for performing optical database correlation comprises:

a pattern generator configured for generating correlation patterns based on information from a database a set of targets within which should be found the current target;

an amplitude modulator coupled to said pattern generator, said amplitude modulator configured for modulating the responsive optical signal; and means for threshold sensing of the amplitude modulated responsive optical signal to indicate positive or negative correlation between the target and correlation pattern received from said database used for modulating the amplitude of said responsive optical signal.

22. An apparatus as recited in claim 1, wherein said apparatus is configured for reading the target in either one dimension or two dimensions.

23. An apparatus as recited in claim 1, wherein said apparatus is configured for reading the target as a barcode used in tracking of commercial items, serial control of printed-circuit boards, traceability control of HDD parts, automatic sorting in conveyor lines, tracking of PC media drives, or wafer production.

24. An apparatus as recited in claim 1, wherein said apparatus is configured for reading the target in performing high-speed displacement sensing on that target.

25. An apparatus as recited in claim 1:

wherein said apparatus is configured for reading the target in performing high-speed displacement sensing on that target; and wherein high-speed displacement sensing comprises measurement of rough surfaces and/or measurement of width and gap.

26. An apparatus as recited in claim 1, wherein said apparatus is configured for reading the target in response to reflective differences encoded within optical storage media.

27. An apparatus as recited in claim 1, wherein said apparatus is configured for detection the presence or absence of physical objects.

28. An apparatus for reading barcodes and sensing displacements, comprising:

means for generating a broadband pulsed probe beam comprising means for supercontinuum generation for broadening the spectral bandwidth of light emanating from an optical source;

means for Fourier-transformation mapping of the spectrum of said pulsed probe beam into a spatial domain directed at a target to be read based on its responsive optical signal;

means for dispersive Fourier-transformation of said responsive optical signal to convert said responsive optical signal into a time-domain waveform; and means for detecting and analyzing said time-domain waveform to determine barcode patterns and/or displacements within the target being read.

29. An apparatus as recited in claim 28, wherein said responsive optical signal is created in response to optical energy which is reflected from the target to said means for dispersive Fourier-transformation, or optical energy that is transmitted through the target to said means for dispersive Fourier-transformation.

30. An apparatus as recited in claim 28, wherein said probe beam and said responsive optical signal are carried through free-air, optical fiber, or through a combination of free-air and optical fiber.

31. An apparatus as recited in claim 28, wherein said means for generating said broadband pulsed probe beam comprises a laser configured to generate pulses.

32. An apparatus as recited in claim 28, further comprising means for picking selected pulses from a train of pulses generated by said means for generating a broadband pulsed probe beam.

33. An apparatus as recited in claim 28, further comprising means for amplification and/or filtering coupled to said means for generating a broadband pulsed probe beam for increasing the signal-to-noise ratio and detection sensitivity of said pulsed probe beam.

34. An apparatus as recited in claim 28, further comprising means for separating said pulsed probe beam directed toward the target, from a responsive optical signal returning from the target.

35. An apparatus as recited in claim 28, wherein said means for detecting and analyzing said time-domain waveform comprises:

at least one photo responsive element;

a digitizer coupled to said photo responsive element, said digitizer configured for converting the optical waveform into a digital signal; and a digital signal processor configured for analyzing said digital signal to read the target.

36. An apparatus as recited in claim 28, further comprising optical amplification and/or filtering before, within, or after said means for dispersive Fourier-transformation.

37. An apparatus as recited in claim 28, further comprising means for performing optical database correlation matched detection on the target.

38. An apparatus as recited in claim 28, wherein said apparatus is configured for reading the target in either one dimension or two dimensions.

39. An apparatus as recited in claim 28, wherein said apparatus is configured for reading the target as a barcode used in tracking of commercial items, serial control of printed-circuit boards, traceability control of HDD parts, automatic sorting in conveyor lines, tracking of PC media drives, or wafer production.

40. An apparatus as recited in claim 28, wherein said apparatus is configured for reading the target in performing high-speed displacement sensing on that target.

41. An apparatus as recited in claim 28:

wherein said apparatus is configured for reading the target in performing high-speed displacement sensing on that target; and wherein high-speed displacement sensing comprises measurement of rough surfaces and/or measurement of width and gap.

42. An apparatus as recited in claim 28, wherein said apparatus is configured for reading the target in response to reflective differences encoded within optical storage media.

43. An apparatus as recited in claim 28, wherein said apparatus is configured for detection the presence or absence of physical objects.

44. An apparatus for reading barcodes and sensing displacements, comprising:
- means for generating a broadband pulsed probe beam;
- means for Fourier-transformation mapping of the spectrum of said pulsed probe beam into a spatial domain directed at a target to be read based on its responsive optical signal;
- means for dispersive Fourier-transformation of said responsive optical signal to convert said responsive optical signal into a time-domain waveform; and
- means for detecting and analyzing said time-domain waveform to determine barcode patterns and/or displacements within the target being read;
- wherein said means for Fourier-transformation mapping is performed by a dispersive element comprising a diffraction grating or prism to separate the wavelength of said pulsed probe beam; or wherein said means for dispersive Fourier-transformation converts said responsive optical signal into a time-domain waveform comprising an element for inducing group-velocity dispersion (GVD).

45. An apparatus as recited in claim 44, wherein said element for inducing group-velocity dispersion (GVD) comprises a dispersive element and/or chirped optical element.

46. An apparatus as recited in claim 44, wherein said responsive optical signal is created in response to optical energy which is reflected from the target to said means for dispersive Fourier-transformation, or optical energy that is transmitted through the target to said means for dispersive Fourier-transformation.

47. An apparatus as recited in claim 44, wherein said probe beam and said responsive optical signal are carried through free-air, optical fiber, or through a combination of free-air and optical fiber.

48. An apparatus as recited in claim 44, wherein said means for generating said broadband pulsed probe beam comprises a laser configured to generate pulses.

49. An apparatus as recited in claim 44, further comprising means for picking selected pulses from a train of pulses generated by said means for generating a broadband pulsed probe beam.

50. An apparatus as recited in claim 44, further comprising means for amplification and/or filtering coupled to said means for generating a broadband pulsed probe beam for increasing the signal-to-noise ratio and detection sensitivity of said pulsed probe beam.

51. An apparatus as recited in claim 44, wherein said means for generating a broadband pulsed probe beam comprises means for supercontinuum generation for broadening the spectral bandwidth of light emanating from an optical source.

52. An apparatus as recited in claim 44, further comprising means for separating said pulsed probe beam directed toward the target, from a responsive optical signal returning from the target.

53. An apparatus as recited in claim 44, wherein said means for detecting and analyzing said time-domain waveform comprises:
- at least one photo responsive element;
- a digitizer coupled to said photo responsive element, said digitizer configured for converting the optical waveform into a digital signal; and
- a digital signal processor configured for analyzing said digital signal to read the target.

54. An apparatus as recited in claim 44, further comprising optical amplification and/or filtering before, within, or after said means for dispersive Fourier-transformation.

55. An apparatus as recited in claim 44, further comprising means for performing optical database correlation matched detection on the target.

56. An apparatus as recited in claim 44, wherein said apparatus is configured for reading the target in either one dimension or two dimensions.

57. An apparatus as recited in claim 44, wherein said apparatus is configured for reading the target as a barcode used in tracking of commercial items, serial control of printed-circuit boards, traceability control of HDD parts, automatic sorting in conveyor lines, tracking of PC media drives, or wafer production.

58. An apparatus as recited in claim 44, wherein said apparatus is configured for reading the target in performing high-speed displacement sensing on that target.

59. An apparatus as recited in claim 44:
- wherein said apparatus is configured for reading the target in performing high-speed displacement sensing on that target; and
- wherein high-speed displacement sensing comprises measurement of rough surfaces and/or measurement of width and gap.

60. An apparatus as recited in claim 44, wherein said apparatus is configured for reading the target in response to reflective differences encoded within optical storage media.

61. An apparatus as recited in claim 44, wherein said apparatus is configured for detection the presence or absence of physical objects.

62. An apparatus for reading barcodes and sensing displacements, comprising:
- means for generating a broadband pulsed probe beam;
- means for Fourier-transformation mapping of the spectrum of said pulsed probe beam into a spatial domain directed at a target to be read based on its responsive optical signal;
- means for dispersive Fourier-transformation of said responsive optical signal to convert said responsive optical signal into a time-domain waveform; and
- means for detecting and analyzing said time-domain waveform to determine barcode patterns and/or displacements within the target being read; and
- optical amplification and/or filtering before, within, or after said means for dispersive Fourier-transformation;
- wherein said optical amplification is performed using stimulated Raman scattering, a semiconductor amplifier, or a fiber amplifier.

63. An apparatus for reading barcodes and sensing displacements, comprising:
- means for generating a broadband pulsed probe beam;
- means for Fourier-transformation mapping of the spectrum of said pulsed probe beam into a spatial domain directed at a target to be read based on its responsive optical signal;
- means for dispersive Fourier-transformation of said responsive optical signal to convert said responsive optical signal into a time-domain waveform;
- means for detecting and analyzing said time-domain waveform to determine barcode patterns and/or displacements within the target being read;
- a fiber amplifier disposed before, within, or after said means for dispersive Fourier-transformation; and
- a continuous-wave light or pulsed light pumping said fiber amplifier.

64. An apparatus for reading barcodes and sensing displacements, comprising:
- means for generating a broadband pulsed probe beam;
- means for Fourier-transformation mapping of the spectrum of said pulsed probe beam into a spatial domain directed at a target to be read based on its responsive optical signal;
- means for dispersive Fourier-transformation of said responsive optical signal to convert said responsive optical signal into a time-domain waveform;
- means for detecting and analyzing said time-domain waveform to determine barcode patterns and/or displacements within the target being read;
- means for performing optical database correlation matched detection on the target, comprising:
  - (i) an electro-optic modulator disposed prior to conversion of said responsive optical signal to an electrical signal; and
  - (ii) a database coupled to said electro-optic modulator for controlling optical modulation;
  - (iii) wherein an expected barcode pattern is received from the database and its conjugate applied to said electro-optic modulator; and
  - (iv) wherein correlation matched detection of the target to the database is realized in response to whether or not the responsive optical signal being detected has a correlation peak.

65. An apparatus for reading barcodes and sensing displacements, comprising:
- means for generating a broadband pulsed probe beam;
- means for Fourier-transformation mapping of the spectrum of said pulsed probe beam into a spatial domain directed at a target to be read based on its responsive optical signal;
- means for dispersive Fourier-transformation of said responsive optical signal to convert said responsive optical signal into a time-domain waveform; and
- means for detecting and analyzing said time-domain waveform to determine barcode patterns and/or displacements within the target being read;
- means for performing optical database correlation matched detection on the target, comprising:
  - (i) a pattern generator configured for generating correlation patterns based on information from a database a set of targets within which should be found the current target;
  - (ii) an amplitude modulator coupled to said pattern generator, said amplitude modulator configured for modulating the responsive optical signal; and
  - (iii) means for threshold sensing of the amplitude modulated responsive optical signal to indicate positive or negative correlation between the target and correlation pattern received from said database used for modulating the amplitude of said responsive optical signal.

* * * * *